United States Patent
Schneur

(10) Patent No.: US 8,306,875 B2
(45) Date of Patent: Nov. 6, 2012

(54) METHOD AND MEDIUM FOR DETERMINING WHETHER INSURANCE IS REQUIRED FOR STORAGE RESERVATION

(75) Inventor: Avner Schneur, Lexington, MA (US)

(73) Assignee: Avner Schneur, Lexington, MA (US)

( * ) Notice: Subject to any disclaimer, the term of this patent is extended or adjusted under 35 U.S.C. 154(b) by 0 days.

(21) Appl. No.: 13/442,031

(22) Filed: Apr. 9, 2012

(65) Prior Publication Data

US 2012/0215572 A1 Aug. 23, 2012

Related U.S. Application Data

(62) Division of application No. 12/776,220, filed on May 7, 2010, now abandoned.

(51) Int. Cl.
G06Q 30/00 (2006.01)

(52) U.S. Cl. .................................................. 705/27.1

(58) Field of Classification Search ............. 705/26.1, 705/27.1, 27.2, 7.11, 7.25; 715/769
See application file for complete search history.

(56) References Cited

U.S. PATENT DOCUMENTS

| | | | |
|---|---|---|---|
| 5,712,789 A * | 1/1998 | Radican | 700/226 |
| 6,202,051 B1 * | 3/2001 | Woolston | 705/26.3 |
| 6,219,653 B1 * | 4/2001 | O'Neill et al. | 705/400 |
| 6,415,270 B1 * | 7/2002 | Rackson et al. | 705/36 R |
| 6,933,832 B1 * | 8/2005 | Simms et al. | 340/5.73 |
| 6,937,992 B1 * | 8/2005 | Benda et al. | 705/7.26 |
| 7,702,540 B1 * | 4/2010 | Woolston | 705/26.3 |
| 7,729,952 B1 * | 6/2010 | Kulesza et al. | 705/26.5 |
| 7,818,193 B1 * | 10/2010 | McWhite | 705/7.11 |
| 7,840,429 B2 * | 11/2010 | Benda et al. | 705/7.11 |
| 7,899,823 B1 * | 3/2011 | Trandal et al. | 707/736 |
| 2002/0035515 A1 * | 3/2002 | Moreno | 705/26 |
| 2003/0023453 A1 * | 1/2003 | Hafen et al. | 705/1 |
| 2004/0128224 A1 * | 7/2004 | Dabney et al. | 705/37 |
| 2005/0114229 A1 * | 5/2005 | Ackley et al. | 705/26 |
| 2005/0278204 A1 * | 12/2005 | Weinberg et al. | 705/7 |
| 2005/0289040 A1 * | 12/2005 | Lecker et al. | 705/37 |
| 2006/0122858 A1 * | 6/2006 | Miles et al. | 705/1 |
| 2006/0161481 A1 * | 7/2006 | Krulik | 705/26 |
| 2006/0206342 A1 * | 9/2006 | Shoen et al. | 705/1 |
| 2007/0174130 A1 * | 7/2007 | Seeley | 705/26 |
| 2008/0215366 A1 * | 9/2008 | Robson et al. | 705/2 |
| 2010/0049537 A1 * | 2/2010 | Erie et al. | 705/1 |

OTHER PUBLICATIONS

Aug. 2009—http://wayback.archive.org/web/20090801000000/http://www.backloadmoving.co.nz/utils/estimator4.htm.*

* cited by examiner

*Primary Examiner* — Jeffrey A Smith
*Assistant Examiner* — Matthew Zimmerman
(74) *Attorney, Agent, or Firm* — Robert Schuler

(57) ABSTRACT

A user interface being configured to display a plurality of icons representing physical items, display a drag region, provide an option for the user to select items for storage in a storage unit by dragging and dropping the icons onto the drag region, display an estimated amount of storage space to store the selected items, display an estimated cost to store the selected items, provide at least one or an option for the user to self-deliver the selected items, provide an option for the user to select options associated with the storage of the selected items, receive identify information from the user, receive payment information from the user, and provide a confirmation to the user.

22 Claims, 23 Drawing Sheets

SELECT UNIT ✓ → SELECT ITEMS ✓ → MANAGE ITEMS ✓ → PAYMENT → SUMMARY

Thank You !!!

A representative will contact you shortly.

FIG. 20

METHOD AND MEDIUM FOR DETERMINING WHETHER INSURANCE IS REQUIRED FOR STORAGE RESERVATION

CROSS REFERENCE TO RELATED APPLICATIONS

This application claims priority to and is a divisional of co-owned, U.S. patent application Ser. No. 12/776,220, filed May 7, 2010 now abandoned and entitled "STORAGE RESERVATION AND MANAGEMENT", the entire contents of which are incorporated herein by reference.

BACKGROUND

Today, many people have a need to store items outside of their personal residence and/or office. There can be many reasons for this. Often times the reason for using outside storage is simply because a person has too many things for their in-house storage space. Other times the reason is because the person has items that require more specialized, and/or more secure storage than is otherwise available. In some situations, a person's particular circumstances can lead to a need for renting storage space. For example, students sometimes need additional storage during summer months, and/or during vacation periods.

Traditionally, people have had to go to a storage company, guess at the amount of storage space needed, and bring all of their items to the storage unit themselves. This process is, however, time-consuming, inaccurate, and often results in a person selecting a storage unit that is either too small or too big for their needs. Additionally, many people do not have the resources available, and/or physical strength needed to bring items to and from the storage shed, especially when the items are large and bulky.

SUMMARY

Various aspects of the invention may provide one or more of the following capabilities. Storage space can be reserved more efficiently when compared with prior techniques. Storage space can be reserved conveniently at home over the web. Storage availability information can be provided to a user in real time. The user can reserve only the minimum amount of storage space necessary for the items being stored. Users can eliminate the need to bring items to the storage unit for storage by arranging for a pickup. Users can purchase insurance on stored items. Users can more efficiently manage stored items by associating pictures and/or nicknames with stored items. Users can arrange for the disposal of stored items via a webpage. Users can arrange for stored items to be sold via a webpage. Users can more efficiently retrieve stored items when compared with prior techniques. Users can reserve storage space a fixed location, and/or portable storage that is brought to the user. Users can store arrange for storage of items that typically require special handling such as fine art, wine, and documents. Mobile storage containers (e.g., PODS) can be ordered, delivered, and/or redelivered to the user more efficiently when compared with prior techniques. Mobile storage containers can be picked up from users more efficiently when compared with prior techniques.

These and other capabilities of the invention, along with the invention itself, will be more fully understood after a review of the following figures, detailed description, and claims.

BRIEF DESCRIPTION OF THE FIGURES

FIGS. 4-7A, and 8-9A show exemplary screen shots of a user interface that can be used with the system shown in FIG. 1.

FIGS. 11-18 show exemplary screen shots of a user interface that can be used with the system shown in FIG. 1.

FIGS. 19-21 show exemplary screen shots of a user interface that can be used with the system shown in FIG. 1.

DETAILED DESCRIPTION

Embodiments of the invention provide techniques for online reservation of storage space and related services. Via a webpage, customers can find a desired location to store their personal effects. The customers are able to estimate the amount of storage space needed using an online calculator that allows the customer to input the approximate number, size, and type of the items being stored. Upon selecting a desired amount of storage space, the customer is able to confirm the price, confirm the location, and reserve the unit. The customer is also able to choose pickup, drop-off, and disposal options (e.g., eBay, or trash) for their items. Additionally, the customer is also able to provide payment for the storage units reserved, and for the services requested. Other embodiments are within the scope of the invention.

Reservation of Storage Space

Figure 1:
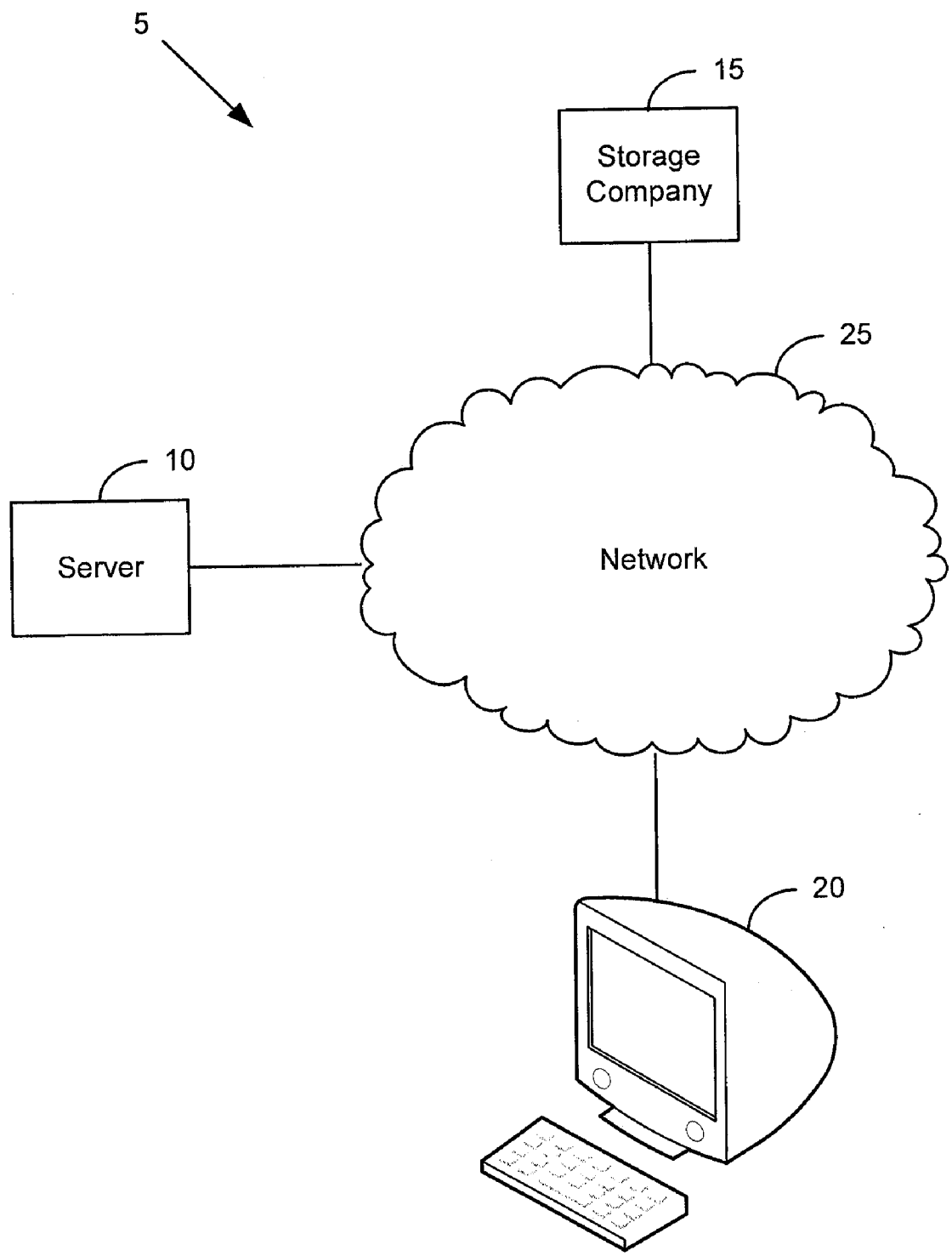
FIG. 1 is a diagram of an exemplary system that can be used to reserve and/or manage storage space.

Referring to FIG. 1, an exemplary system that can be configured to implement the processes described herein is shown. A system 5 preferably includes a server 10, a storage company 15, a user computer 20, and a network 25. Preferably, the network 25 is configured to provide for data communication between the server 10, the storage company 15, and the user computer 20. The network 25 can be, for example, the Internet. Other configurations than that shown in FIG. 1 are possible to implement the processes described herein. For example, some functional blocks can be combined with other blocks (e.g., the server 10 can be combined with the storage company 15).

The server 10 is preferably a server configured to provide a user interface to the user computer 20. The network server 10 can be, for example, a commonly available Web server. The server 10 can include a memory that is used to store information such as web pages, databases, and other computer readable instructions. The network server 10 can be configured to provide, for example, an interactive web-based interface that includes the use of Java and/or Flash. The server 10 can also be configured to receive input from the user computer 20, and to provide a response to the user computer 20. Additionally, the network server 10 can also be configured to communicate with the storage company 15, and/or any other third parties that are connected to the network 25.

Figure 3:
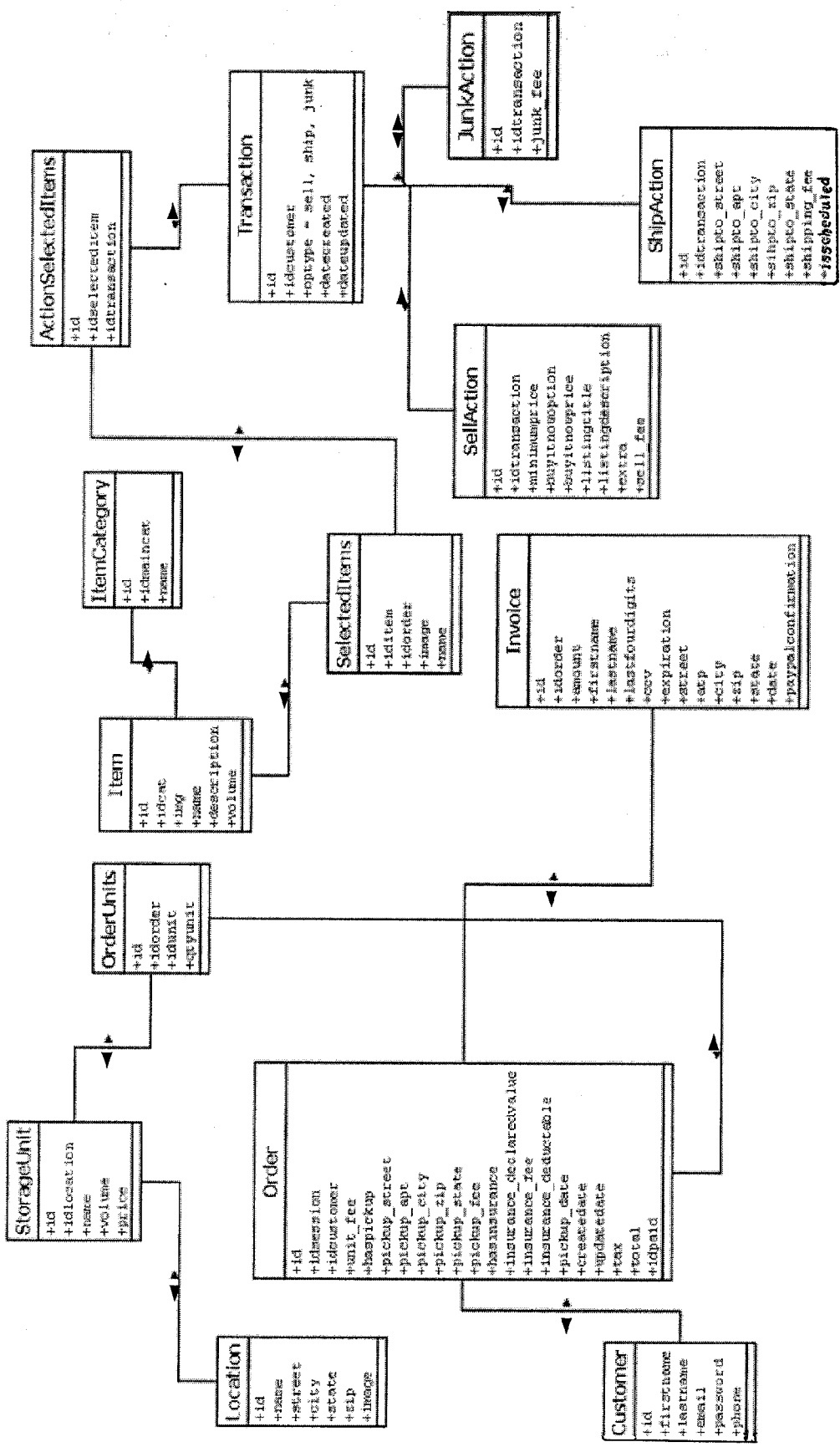
FIG. 3 is an interrelation diagram showing exemplary memory structures that can be used with the system of FIG. 1.
Figure 4:
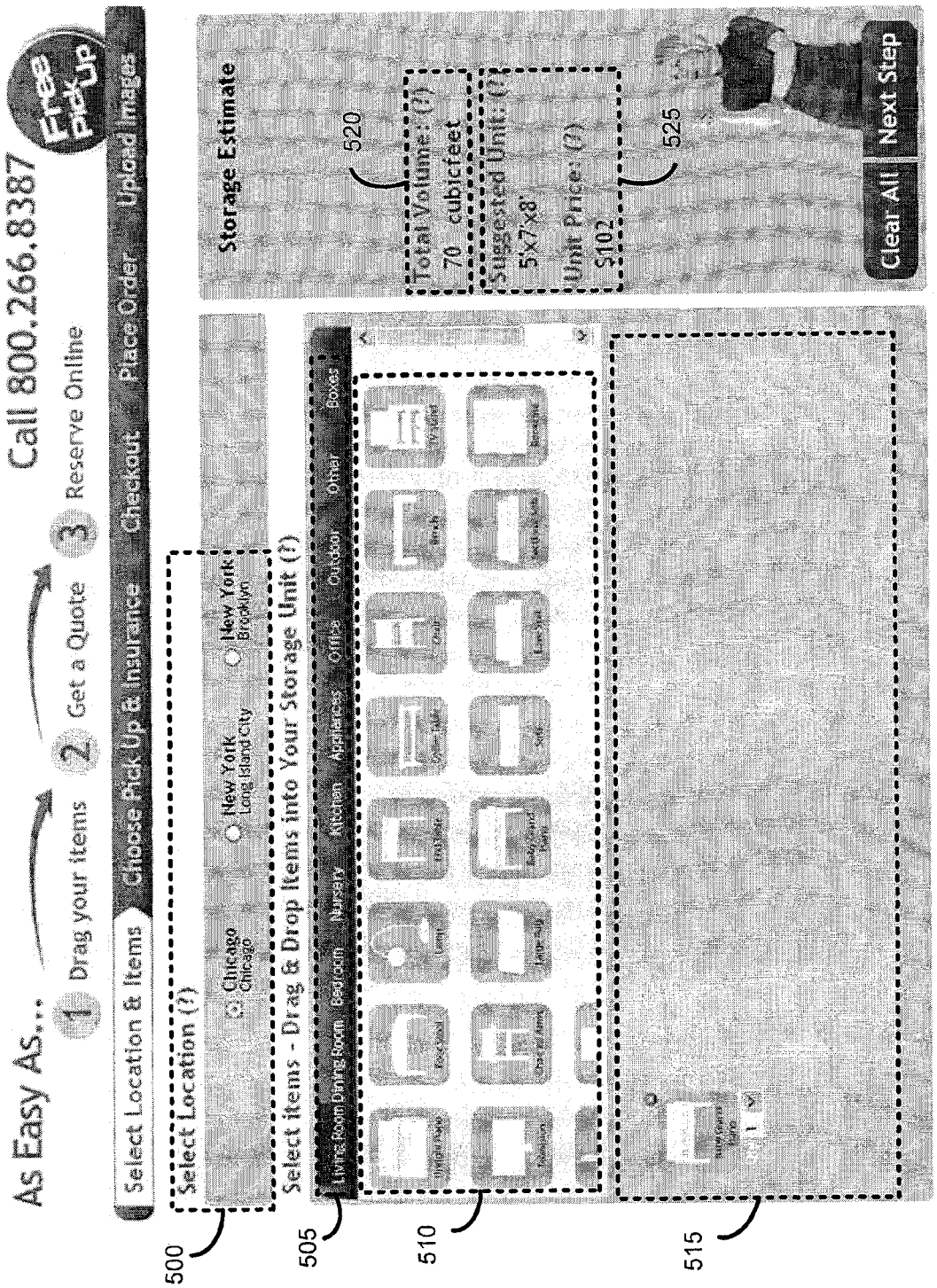

The network server 10 preferably communicates with a memory that is either included in the network server 10, or remotely located. The memory can be configured to store information related to the reservation of storage space, and management of stored items. FIG. 3 shows several exemplary data structures that the server 10 can create, modify, access, and/or store in the memory throughout the processes described herein. Other data structures are possible. Additionally, the memory (or other computer readable storage device) can contain computer readable instructions that executed by the network server 10 to implement the processes described herein.

The storage company 15 is preferably a company that can provide storage services. The storage company 15 preferably has a computer system that is configured to interact with the network server 10 via the network 25. The storage company 15 can provide storage space for items such as personal effects, wine, documents, fine art, etc. The storage company 15 can provide storage services at a fixed location, or can provide storage containers that are delivered to the user (e.g., mobile storage units). Preferably, the storage company offers different sizes of storage space so that any customer may pick the appropriate size (e.g., 5'×10', 10'×10', 15'×20', etc.). The storage company 15 preferably maintains inventory information that can be communicated to the network server 10 such that the user can be made aware of available units in real time.

The user computer 20 is preferably any type of computer or mobile device that can access the Internet, and provide a user interface to a user. For example, the user computer 20 can be a personal computer, a tablet computer (e.g., an APPLE IPAD), and/or a mobile device such as a smartphone (e.g., a RIM BLACKBERRY, an APPLE IPHONE, an HTC NEXUS ONE, etc.). Through the user computer 20, the user 20 can interact with the network server 10.

While this disclosure focuses on a network server 10 as it is shown in FIG. 1, a majority of the functionality described herein may be carried out by other devices as well. For example, the functionality described herein can be implemented as an application that is downloaded to the user device 20. One illustration of this is an application that is downloaded, and executed by a smartphone. In this configuration, the smartphone can communicate directly with the storage company 15 without involving the network server 10.

Figure 2:
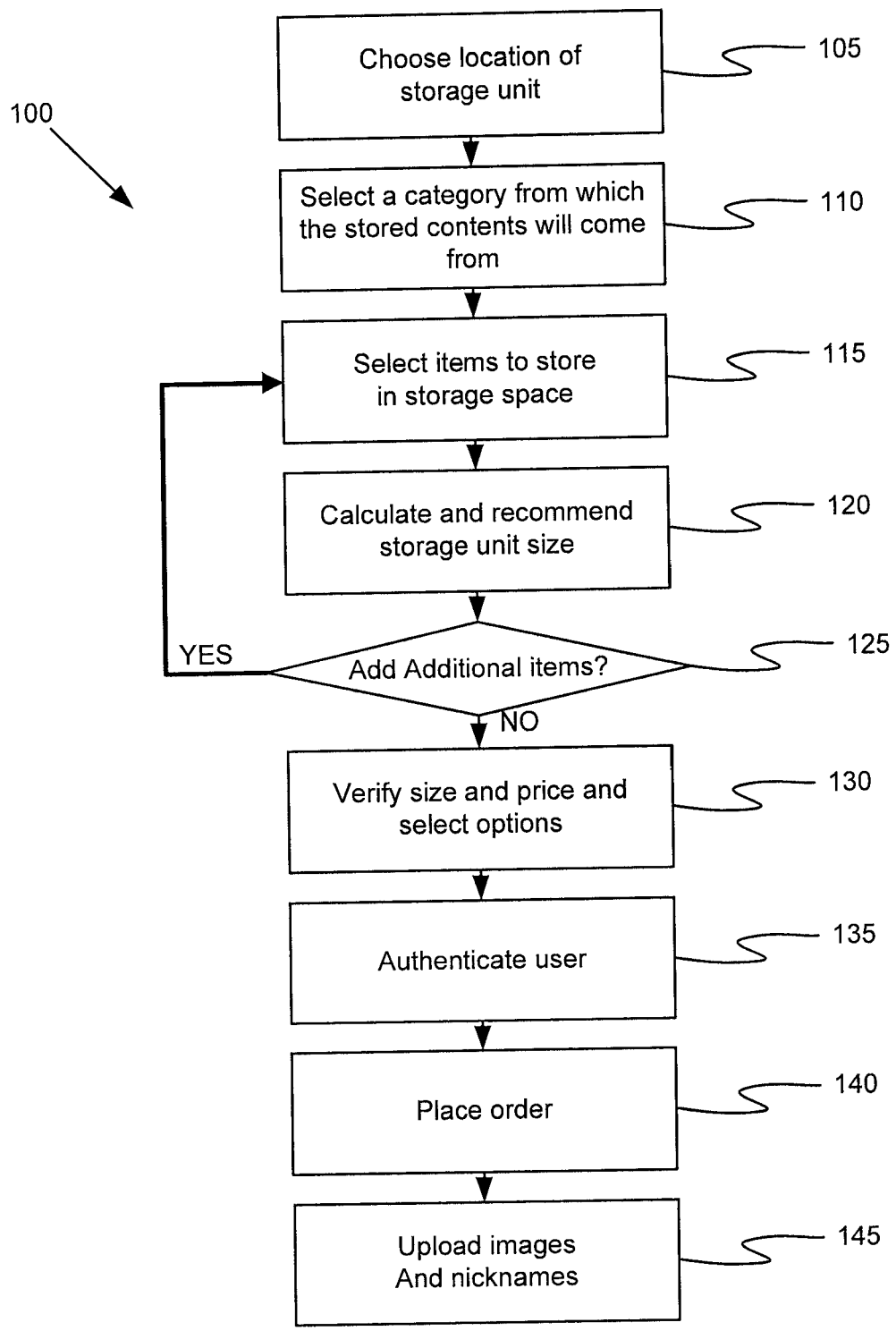
FIG. 2 is a process flow diagram of an exemplary process that can be used with the system of FIG. 1.

In operation, referring to FIG. 2, with further reference to FIGS. 1 and 4-9, a process 100 for reserving storage space using the system 5 includes the stages shown. The process 100, however, is exemplary only and not limiting. The process 100 may be altered, e.g., by having stages added, removed, altered, or rearranged. Exemplary screenshots relating to the process 100 are shown in FIGS. 4-9. Furthermore, process 100 is discussed with reference to a "user." It should be appreciated that the user preferably interfaces with the system 5 via the user computer 20.

At stage 105, a user navigates to a webpage provided by the server 10. Preferably the user is shown a "welcome page" such as that illustrated in FIG. 4. On the welcome page, the user can select a desired storage location (see e.g. box 500). For example, the user can select from a list of predefined storage locations (e.g., Chicago, New York—Brooklyn, New York—Long Island), or can look up a storage location near the user's address.

At stage 110, on the welcome page, a user can select from various categories of items that are typically stored (see e.g. box 505). For example, each category can represent a typical room found in a house (e.g., living room, bedroom, kitchen, office, etc.). Each category preferably has associated with it items that are commonly found within that category (see e.g. box 510). For example, a "living room" can have associated with it sofas, televisions, and bookcases, whereas an "office" can have associated with it printers, copiers, desks, and filing cabinets. The user can select the various categories by, for example, selecting a tab on a webpage, or by using a drop down menu. It is noted, however, that categories are not required, and can be omitted in some embodiments.

At stage 115, the user can select items for storage in the storage space. For example, the user can select an object to store by dragging and dropping an icon representing the item into a drag region (see e.g. box 515). Items can be selected by choosing from the various categories discussed above during stage 110. The user is also able to select a quantity for each item by, for example, selecting a quantity from a pulldown menu and/or entering a specific quantity. Alternatively, the user can repeatedly drag and drop the same icon onto the drag region, and the server 10 will automatically update the quantity of the item to reflect how many times the item has been dragged into the drag region. The user can also have the option to remove icons by dragging the icon out of the drag region, pressing an "X" button on the icon, and/or pressing a "clear all" button.

The categories and types of specific objects presented to the user can be varied depending on the type of storage space being reserved. For example, if the storage company 15 provides i) household storage, then the categories and icons can reflect typical items found in a residence, ii) wine storage, then the categories and icons can reflect various types of wine bottles that can be stored (e.g., standard bottle, magnum, case, half-case, etc), iii) fine art storage, then the categories and icons can reflect various types of art that can be stored (e.g., pictures, vases, sculptures, etc.). The server 10 can also be configured to allow the user to input information about the specific items being stored (e.g., selecting storage of a bottle of wine, and then identifying the year, varietal, and vineyard). The categories and icons contained therein are preferably not fixed, and can be defined and/or changed by the server 10 and/or the storage company 15 at any time.

In some embodiments, the user can also select to store boxes, rather than individual items. For example, if the user has packed their belongings (e.g., a college student over the summer), the user can input the number, size, and weight of each box. Alternatively, the user can be presented with a category of icons relating to of common box sizes, from which the user can drag and drop into the drag region.

At stage 120, the server 10 can calculate and recommend the amount of space needed to store the selected items. To do so, the server 10 can be configured such that each item that can be selected has a storage volume associated with it. For example, the server 10 can include a database showing the amount of storage space associated with each item:

TABLE (1)

| Item | Storage Volume |
| --- | --- |
| Baby Grand Piano | 70 ft$^3$ |
| Sofa | 50 ft$^3$ |
| Television | 10 ft$^3$ |

As a user selects additional items to store in the storage space, the server 10 can compute and display a running total of the volume of storage space required to store all of the selected items to the user (see e.g. box 520). In the event that the user stores boxes (rather than individual items), the server 10 can be configured to calculate the volume of the box using the dimensions of the box.

Based upon the total calculated storage space for the selected items, the server 10 can suggest a recommended size for the storage unit, along with an estimated price (see e.g. box 525). The server 10 can be configured to make recommendations based upon the total volume of items that the user wishes to store. In order to make a recommendation, the server 10 can be configured to add volumes of all of the selected items, and use an adjustment factor (e.g., adding or subtracting an additional 25% of storage space). Based upon this calculation, the server 10 can determine which size storage unit is best suited for the user's needs, and make a recommendation. The selection of certain bulky items (e.g., sofas, refrigerators, and pianos) can also cause the network server 10 to automatically select the next larger storage space. If the total volume of calculated storage space exceeds the largest available storage unit, the server 10 can be configured to tell the user that online reservation is not possible, and that the user should call the storage company directly. The server 10 can be configured to consult with the storage company 15 to determine if a particular storage unit is available prior to making a recommendation. An exemplary table is shown below that can be used to recommend a storage unit size.

TABLE (2)

| Volume | Recommended Unit |
|---|---|
| 0-80 ft$^3$ | 5 × 3 × 8' |
| 80-150 ft$^3$ | 5 × 5 × 8' |
| 150-210 ft$^3$ | 5 × 7 × 8' |
| 210-290 ft$^3$ | 8 × 10 × 8' |
| >290 ft$^3$ | Not Available |

Additionally, the user can opt to select the recommended storage unit, or can override the suggestion and pick a different unit if desired.

The server 10 can also be configured to vary the options available to the user depending on the volume of the things being stored. For example, if a certain threshold is crossed, then the server can adjust the options available to the user (e.g., no free pickup, must buy insurance, etc.)

At stage 125, the process 100 returns to the stage 115 if the user selects additional items to store. Otherwise, the process 100 continues to stage 130.

Figure 5:
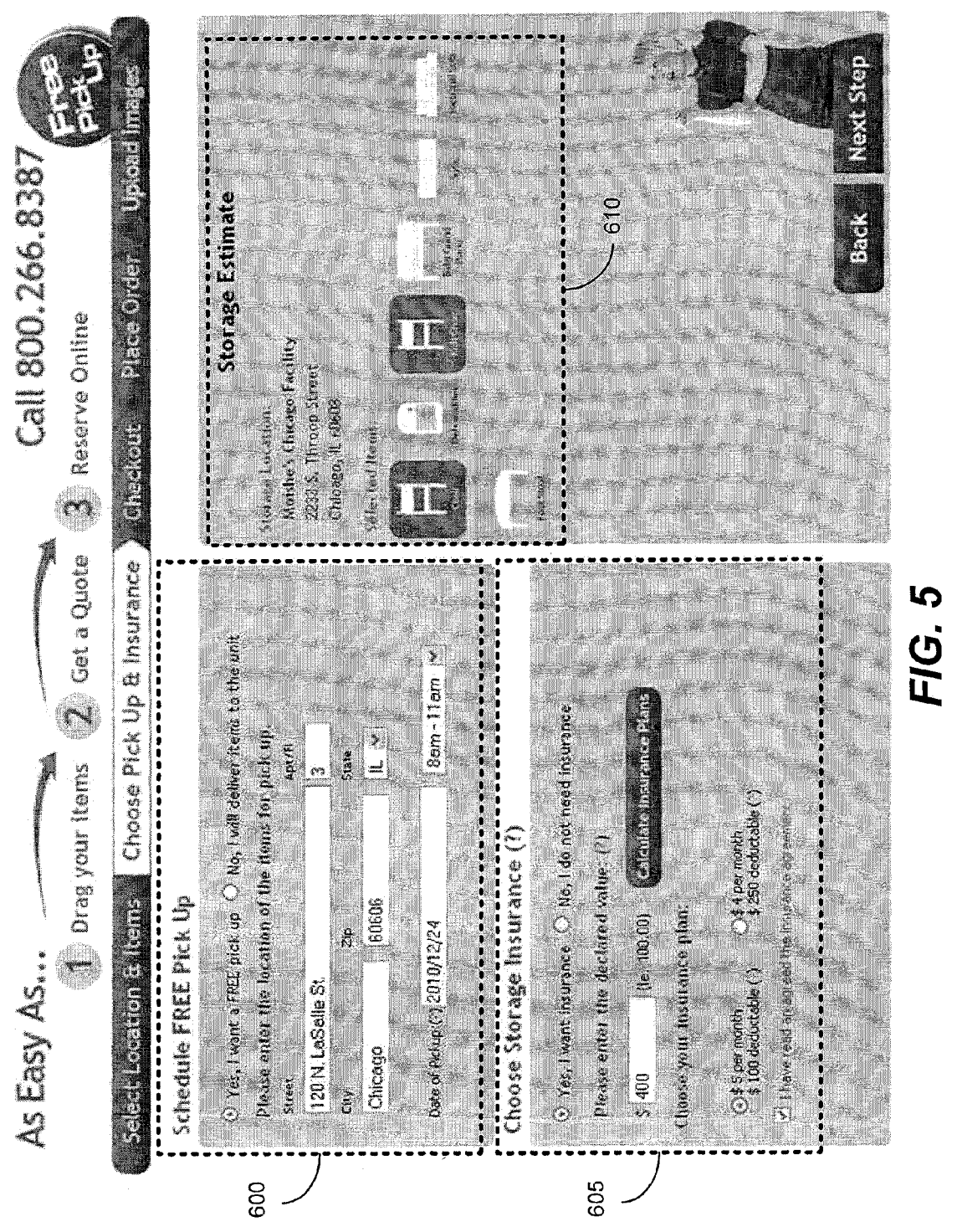

At stage 130, the user can select options associated with the rental of the storage unit on an "options page" such as that shown in FIG. 5. For example, the user can select to have items picked up by the storage company at a specified address, or the user can indicate that no pickup is necessary (see e.g. box 600). Under some circumstances, such as the time of the day, the user can qualify for same-day pickup, causing the network server 10 to display that option to the user. The server 10 can also be configured to display pickup times in time increment buckets (e.g., 8-10 am, 1-3 pm). The server 10 can also be configured to provide for free pickup, or require a pickup fee depending on the volume of items being stored (e.g., requiring a fee if the volume exceeds a threshold). In embodiments where the storage space is brought to the user, such as mobile storage containers, the pickup option can be omitted. The server 10 also preferably displays on the options page the chosen storage location, and icons representing the items that the user has selected for storage (see e.g. box 610).

The user can also have the option to purchase insurance to cover stored items (see e.g. box 605). The user can enter a declared value for the stored items, and select deductible amounts. The user is also preferably prompted to accept the terms and conditions associated with the insurance policy. The user can also have the option to select from different types of insurance (e.g., flood, fire, theft, damage, etc.)

The server 10 can be configured to present different options to the user depending on what kind of items are being stored. For example, in the event that art or wine is being stored, the user can be presented with the option to have the items stored in a climate controlled environment, select a desired storage humidity, to store the item in a high-security location, to attach an RFID tag to an item, to require different types of insurance, etc. Additional options can be presented when storing documents such as a "destroy-by" date, or security designation (e.g., top secret, secret).

The server 10 can be configured to prevent the user from continuing to the next page until all required fields have been completed. Preferably, when the user advances away from the options page, the server 10 is configured to store all of the information input by the user in memory.

Figure 6:
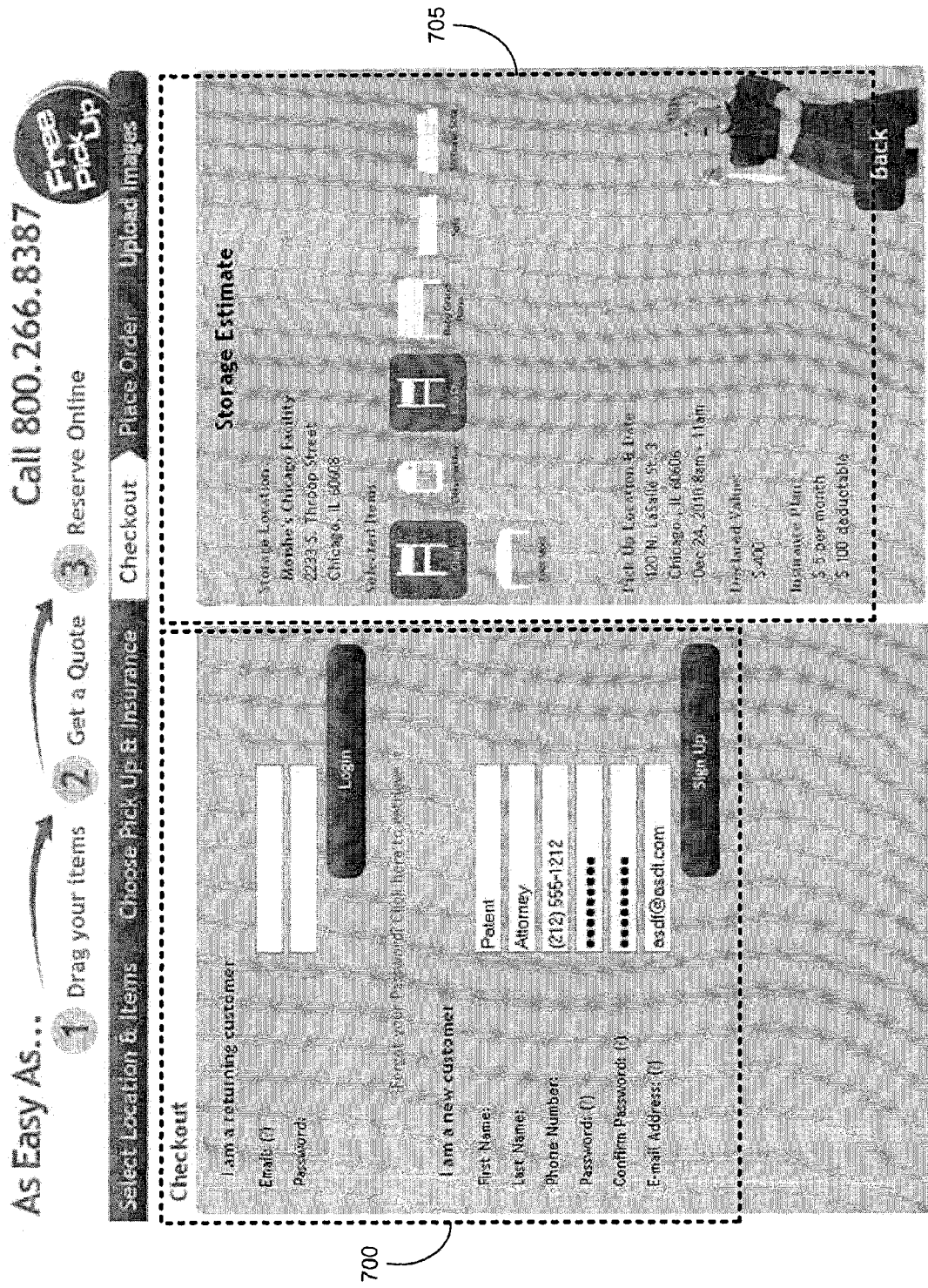

At stage 135, the user completes the checkout process on a "checkout page" such as that shown in FIG. 6. Preferably, the checkout page provides a place for the user provide authentication information (see e.g. box 700). For example, if the user has previously used the service, the user can simply provide a logon and password to proceed. Otherwise, the user can be required to input contact information to create a user account. Preferably, the checkout page also displays a storage estimate recapping some or all of the information previously employed by the user (see e.g. box 705). The server 10 can be configured to verify the identity of the user before allowing the user to proceed.

Figure 7:
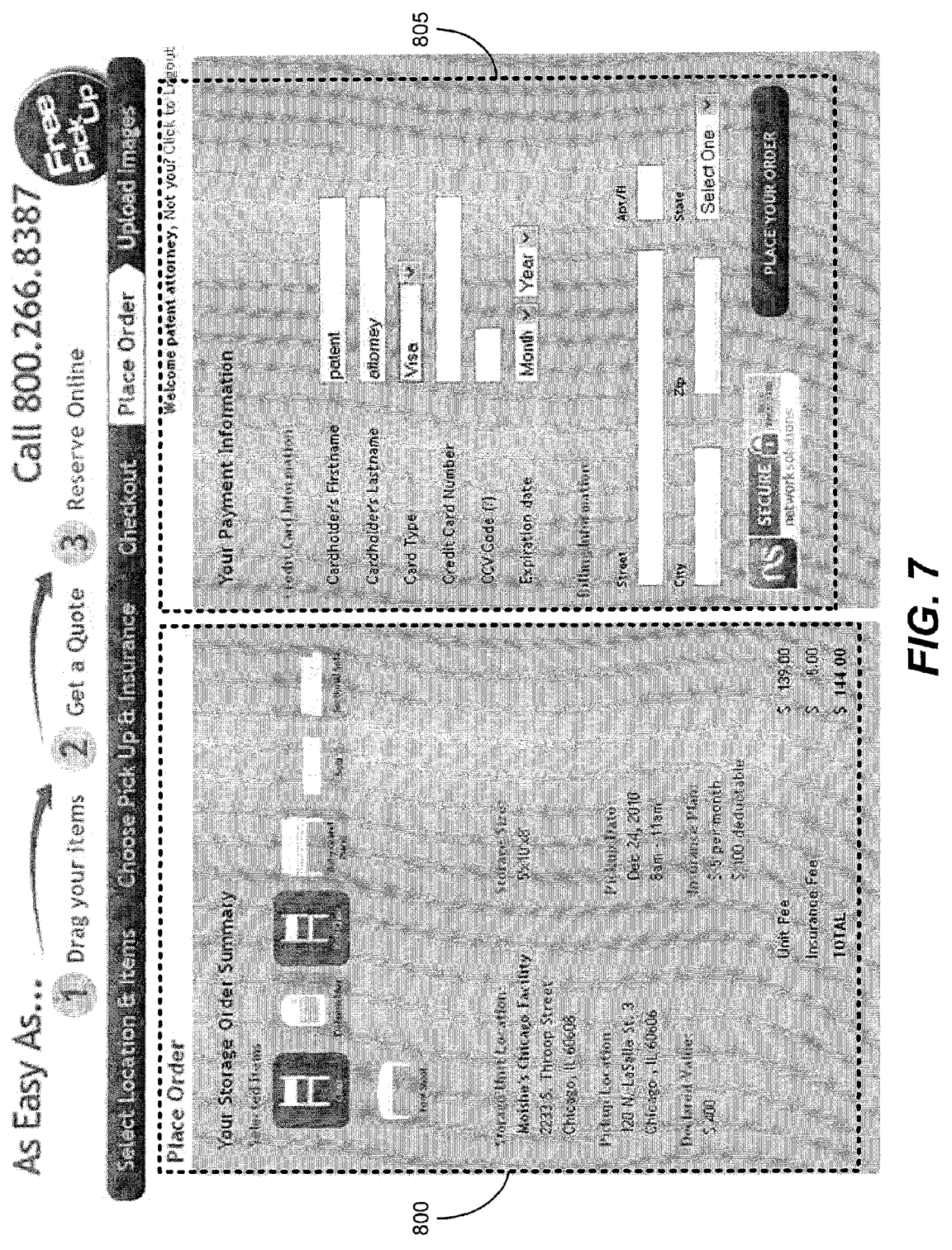
Figure 7A:
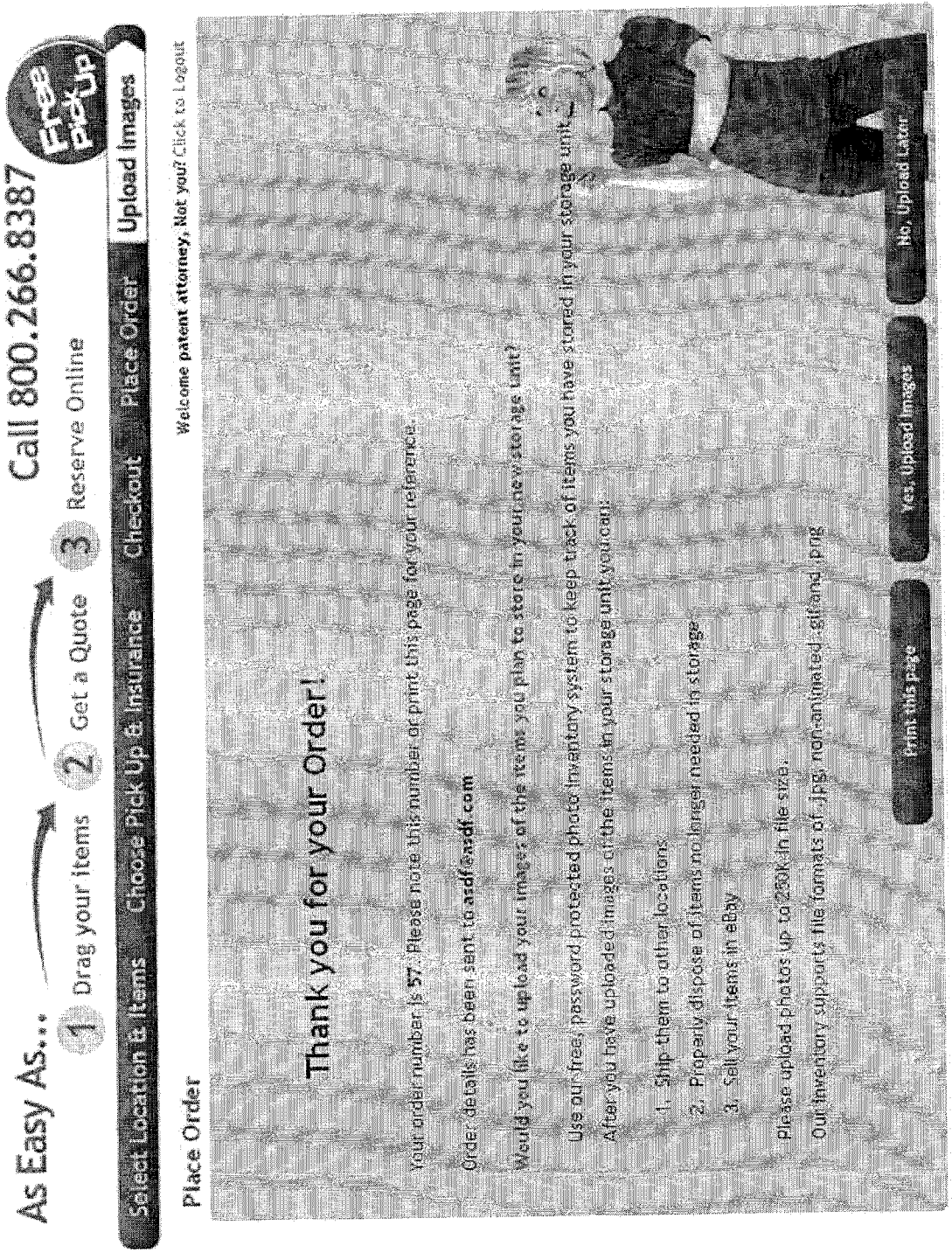

At stage 140, the user progresses to a "place order page" such as that shown in FIG. 7. Preferably, on this page the user is able see a recap of some or all of the information provided so far (see e.g. box 800). Using this information the user can verify that the order is correct. The user can also provide payment information for the storage unit. For example, the user can provide a billing address and a credit card number (see e.g. box 805). Other methods of payment can also be used (e.g., PAYPAL, debit cards, debit accounts, GOOGLE payments, wire transfer, etc.). Alternatively, the server 10 can also be configured to retrieve previously saved payment information from a memory instead of requiring the user to input new payment information.

As a user attempts to proceed to the next step, the server 10 can be configured to verify the payment information provided by the user. In the event that the payment information is rejected, the server 10 can be configured to inform the user of this fact, and to require the user to re-input the payment information.

Preferably, upon completing the place order page, the order is complete. The server 10 can provide the storage company 15 with some or all of the information collected from the user during the process 100 to finalize the order placed by the user. For example, the server 10 can provide to the storage company 15 the identity of the user, the requested size of the storage unit, invoice information, special instructions, reservation details, and payment information provided by the user. The server 10 can also be configured to provide to the storage company 15, and/or a third party, a request for pickup. The server 10 can be configured to cause the sending of an acknowledgement to the user confirming the order. The acknowledgement can come in the form of, for example, an e-mail, an SMS message, a text message, a phone call, a SKYPE message, a FACEBOOK post, and/or a letter, and can contain information such as a confirmation number, date and time of pickup, outstanding issues, invoice information, billing information, etc.

Figure 19:
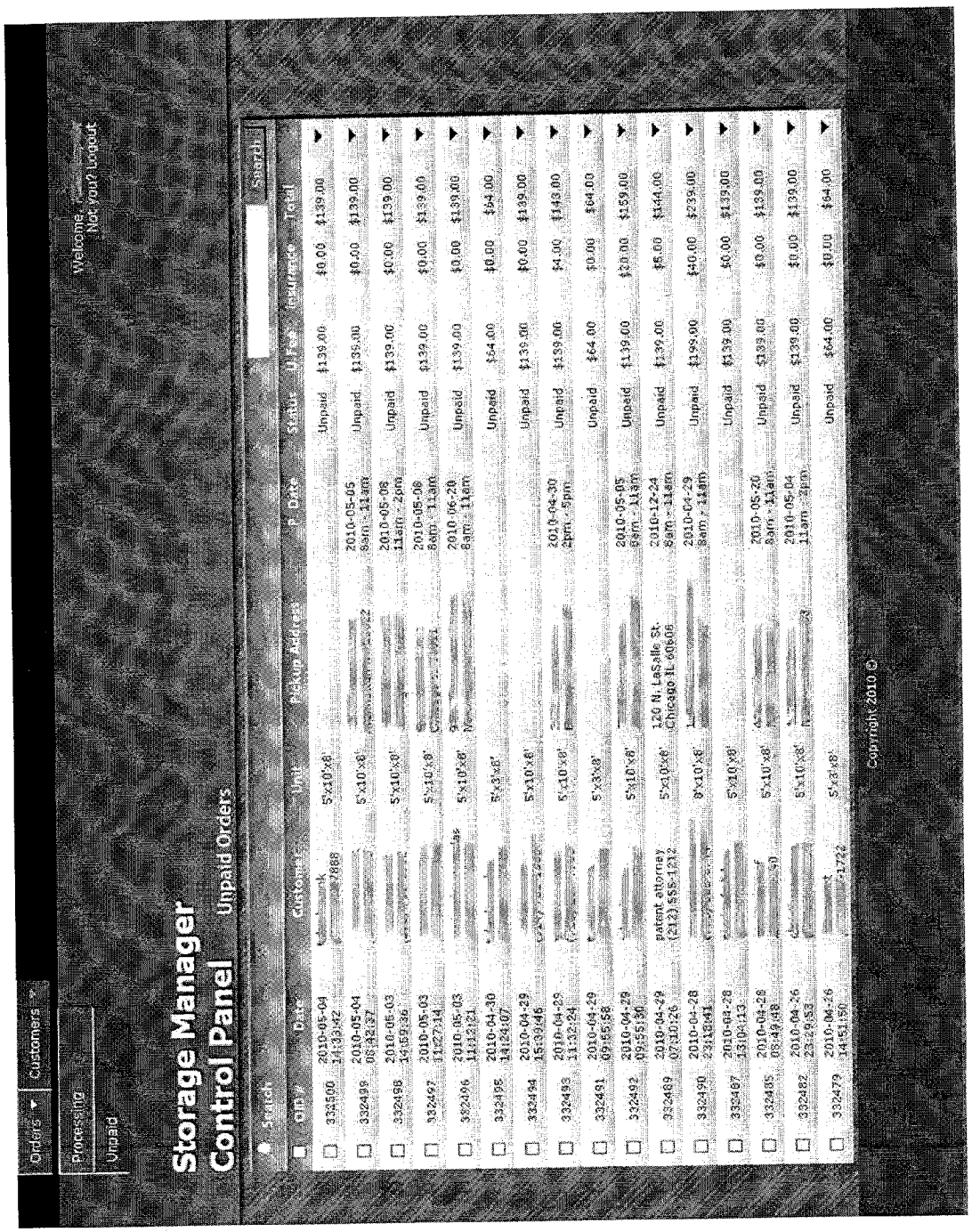
Figure 20:
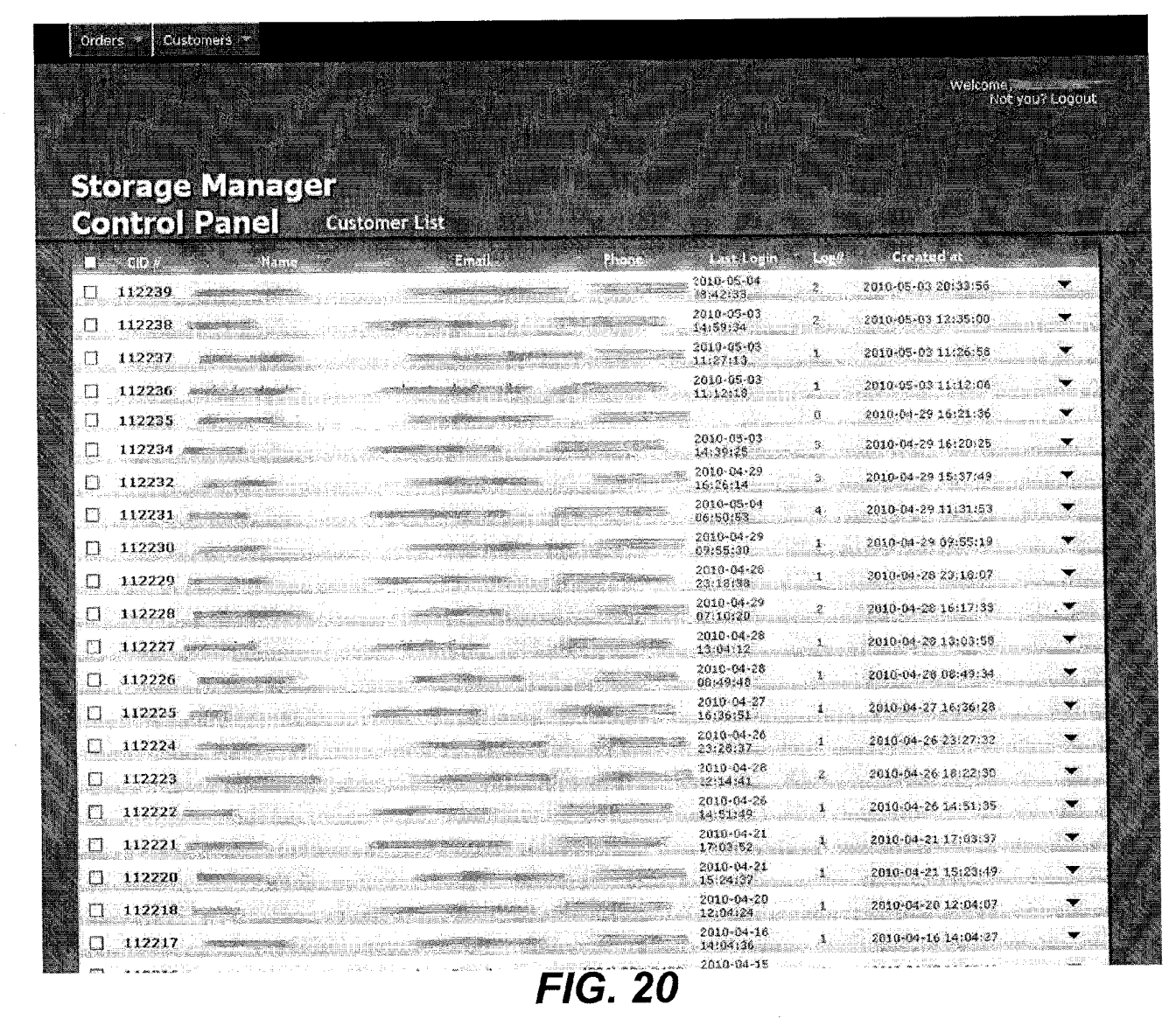

The storage company 15 preferably receives the reservation information from the server 10, and can manipulate the received information (see e.g. FIGS. 19-21, described more below). For example, the storage company 15 can review orders by sorting by location, date, time, size, special instructions, etc. The storage company 15 can preferably communicate with the user with or without the use of the server 10. For example, the server 10 can be configured to facilitate communication between the storage company 15 and the user, and/or the storage company 15 can communicate (e.g., e-mail, telephone, SMS, text, etc.) the user directly.

Figure 8:
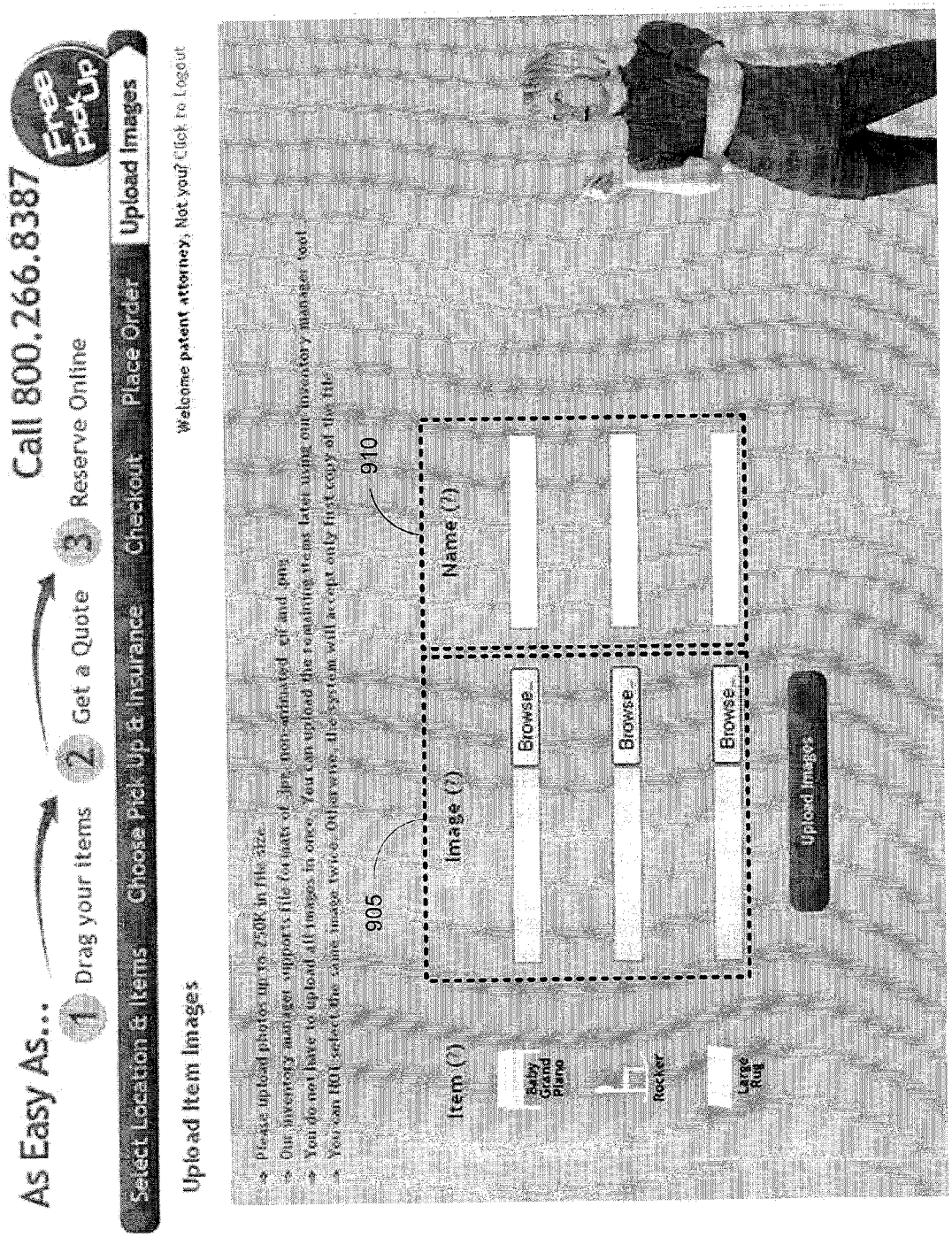
Figure 9:
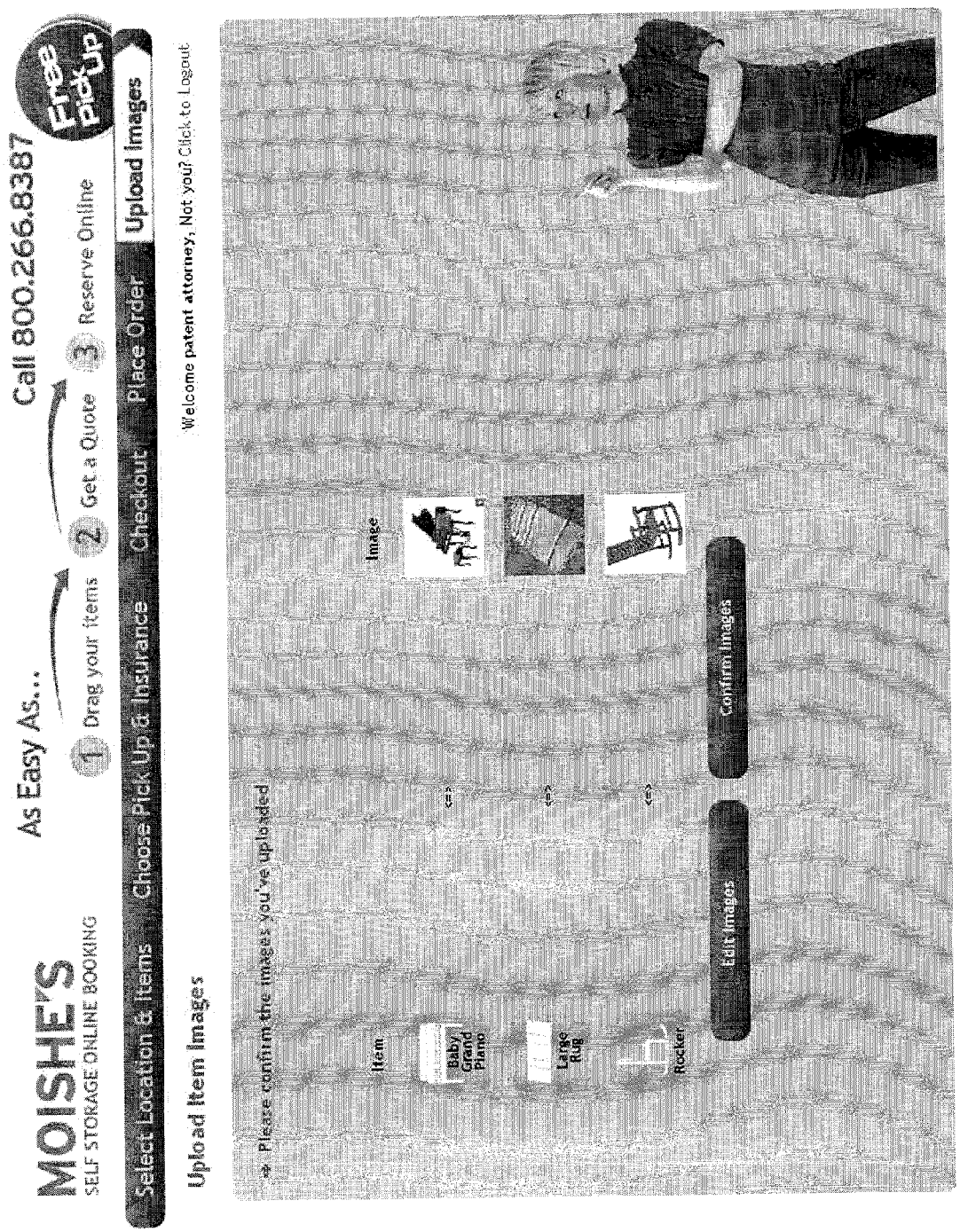
Figure 9A:
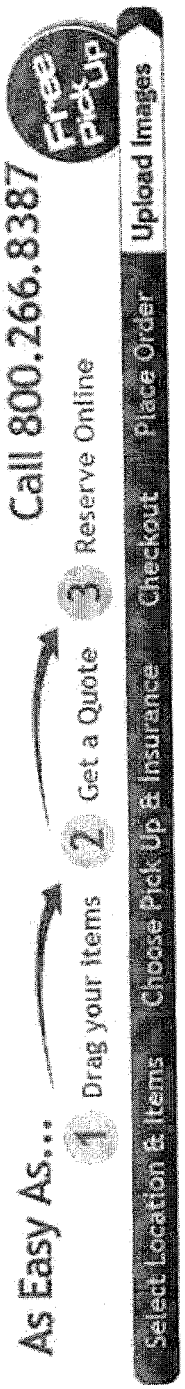
Figure 9A:
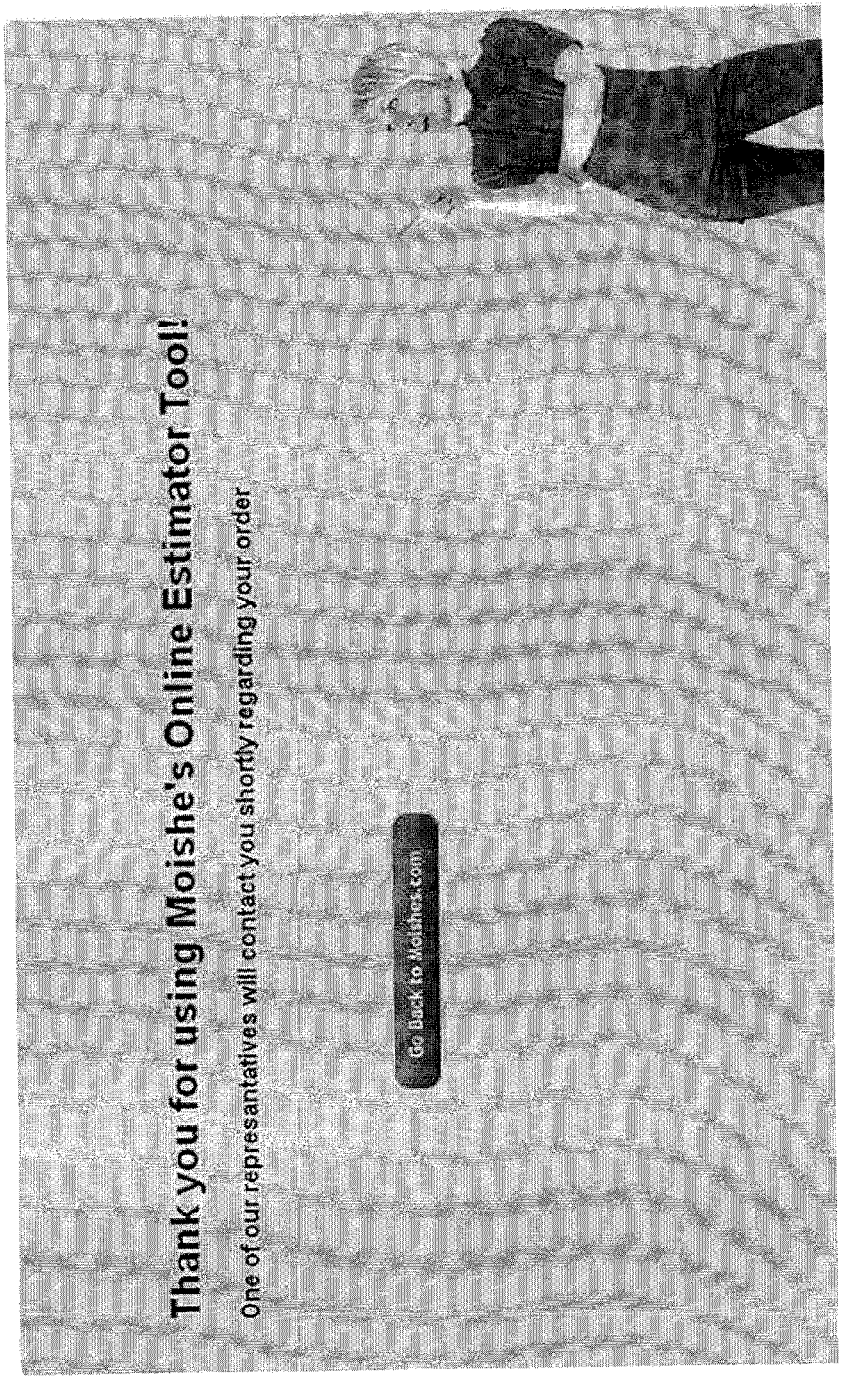
Figure 10:
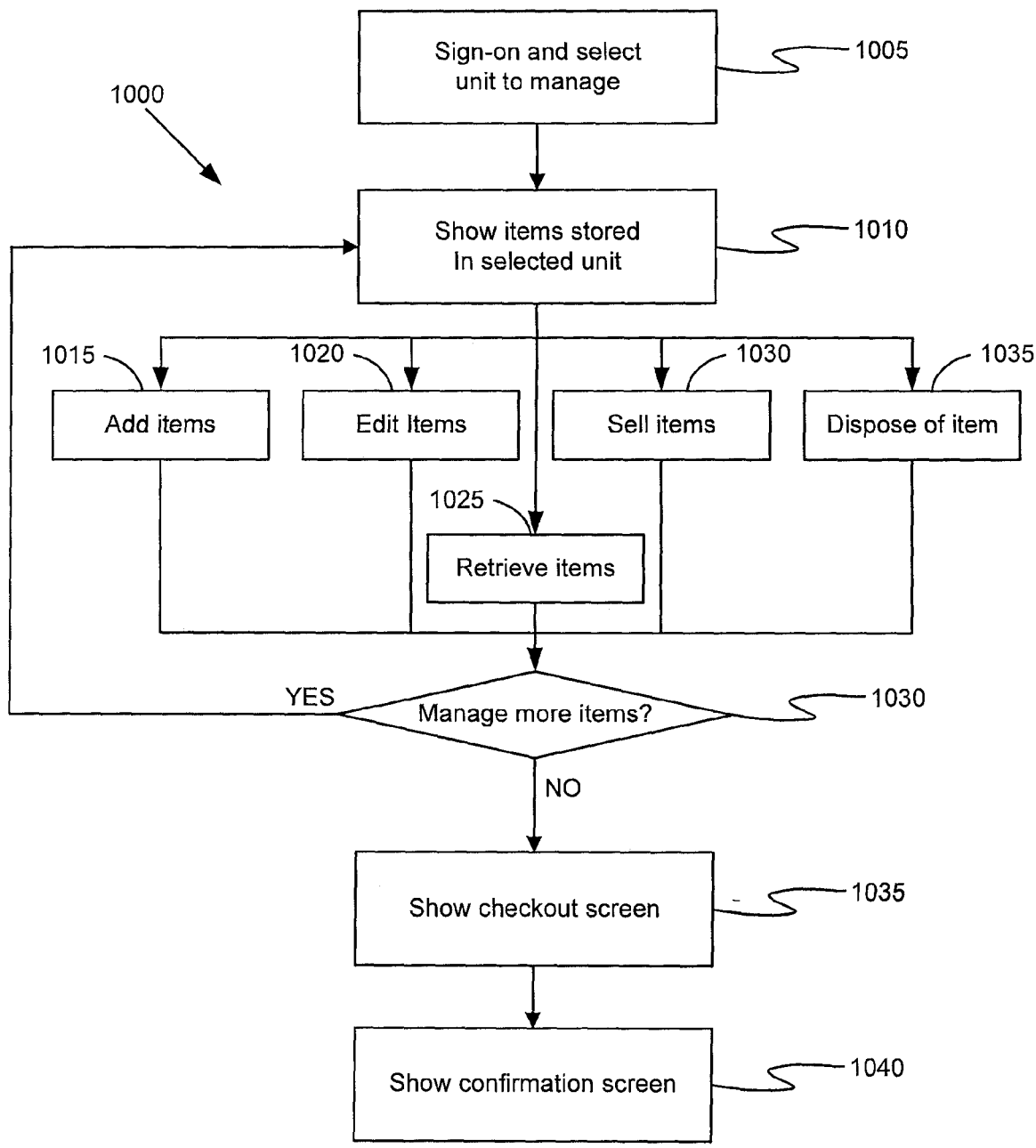
FIG. 10 is a process flow diagram of an exemplary process that can be used with the system of FIG. 1.

At stage 145, the user can optionally be provided with the ability to upload to the server 10 images for each of the stored items (see e.g. FIG. 8). The user is preferably able to browse their computer to select an image for each individual item stored in the storage unit (see e.g. box 905). The user can also save a nickname (see e.g. box 910) for each stored item as well (e.g., bedroom TV). The server 10 can be configured to filter uploaded images to ensure that uploaded images meet predefined criterion such as maximum size, resolution, and file type. Alternatively, the user can also choose to upload images at a later time. Preferably, the server 10 saves the uploaded images in a memory, or alternatively, the storage company 15 can save the uploaded images instead. In still other configurations, the server 10 can present the user with the option to have the storage company 15 and/or a third party take pictures of the stored items, and upload the pictures to the server 10. The user is preferably presented with a confirmation screen where the user can confirm the uploaded images and nicknames (see e.g. FIG. 9), and a thank you screen (see e.g. FIG. 9A). Additionally, in the event that a stores boxes (rather than individual items), the user can also be presented with the option to provide an inventory listing of each box.

Preferably, once the user is done with the reservation process, the storage company can i) send a truck to pick up items from the user to bring back to the storage unit, ii) send a truck to deliver a mobile storage unit, and/or iii) wait for the user to deliver items to the storage company (e.g., in the case where no pickup was desired by the user). In some embodiments, the system 5 can be configured such that no storage is permitted until the user has actually provided payment for the requested services.

In addition, the server 10 can be configured such that if the user attempts to leave the reservation process before, for example, completing a reservation (e.g., by navigating away, or closing the web browser), the server 10 can be configured to provide a special message. The special message can be a warning that all previously input information will be lost, and a prompt asking the user to confirm that they wish to leave. The special message can also be a promotional item such as a discount offer (e.g., 15% discount if the user completes the order now, free storage days, and/or free shipping). Other special messages are possible.

Management of Stored Items

In operation, referring to FIG. 7, with further reference to FIGS. 1, and 10-18, a process 1000 for managing items stored in a storage space includes the stages shown. Using the process 1000, the user is able to manage items that have previously been stored. The process 1000, however, is exemplary only and not limiting. The process 1000 may be altered, e.g., by having stages added, removed, altered, or rearranged. Exemplary screenshots relating to the process 1000 are shown in FIGS. 11-18. Furthermore, process 100 is discussed with reference to a "user." It should be appreciated that the user can interface with the system 5 via the user computer 20.

Figure 11:
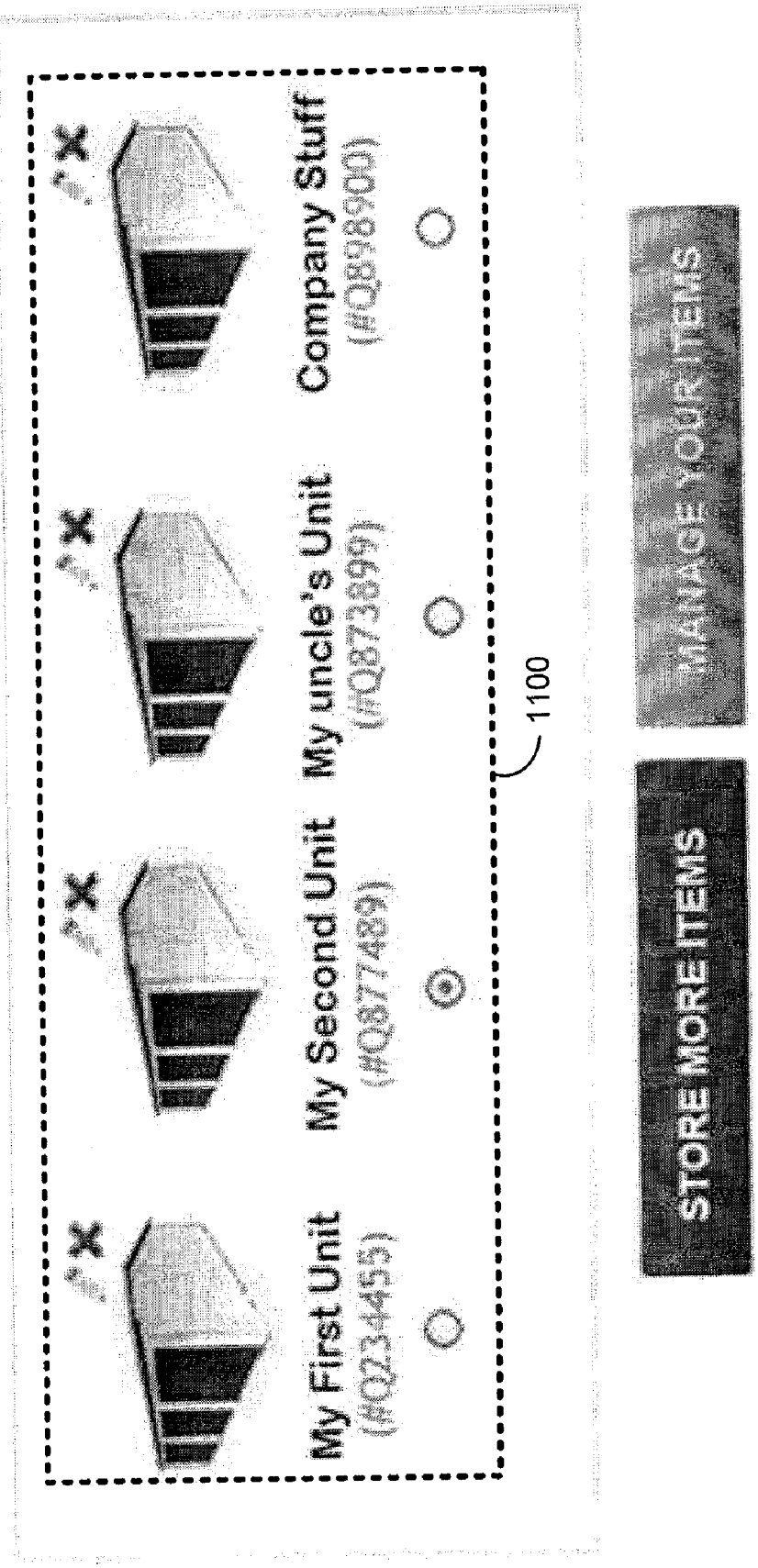

At stage 1005, preferably after the user is authenticated (e.g., by supplying credentials such as a logon and password), the user can be presented with a "selection page" such as that shown in FIG. 11. On the selection page, the user can be presented with a list of storage units associated with that user (see e.g. box 1100). For example, if the user has four separate storage units, the user can be presented with a list of all four storage units such that the user can select a particular unit to manage or add additional items to. Preferably each storage unit shown on the selection page includes other identifying information about each storage unit (e.g., a nickname). While FIG. 11, shows radio buttons used to select a specific storage unit, other methods can be used (e.g., drop-down lists). Additionally, in the event that the user only has a single storage unit, the selection page can be omitted from the process 1000.

Figure 12:
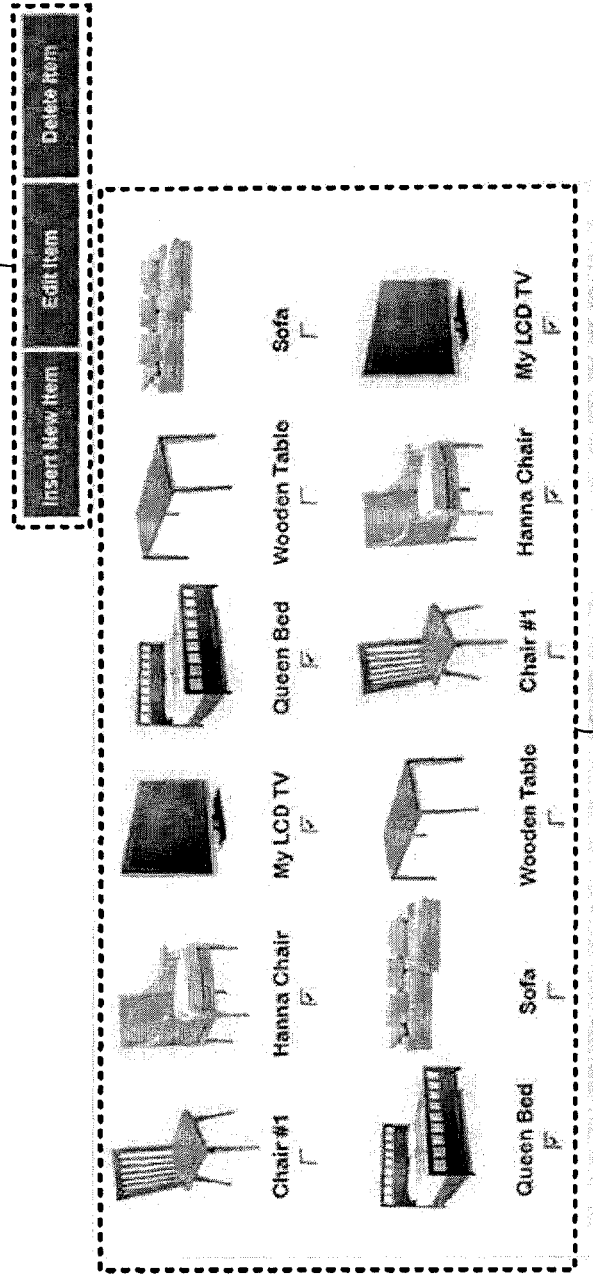
Figure 12:

At stage 1010, the user can be presented with a "management page" such as that shown in FIG. 12. On the management page, the user is preferably presented with a listing of items that are stored in a selected storage unit (see e.g. box 1200). If the user has previously uploaded images for each of the stored items, the user can be presented with the uploaded images rather than a text listing or a generic icon listing. The user can select specific items by, for example, selecting a checkbox next to the item.

Figure 13:
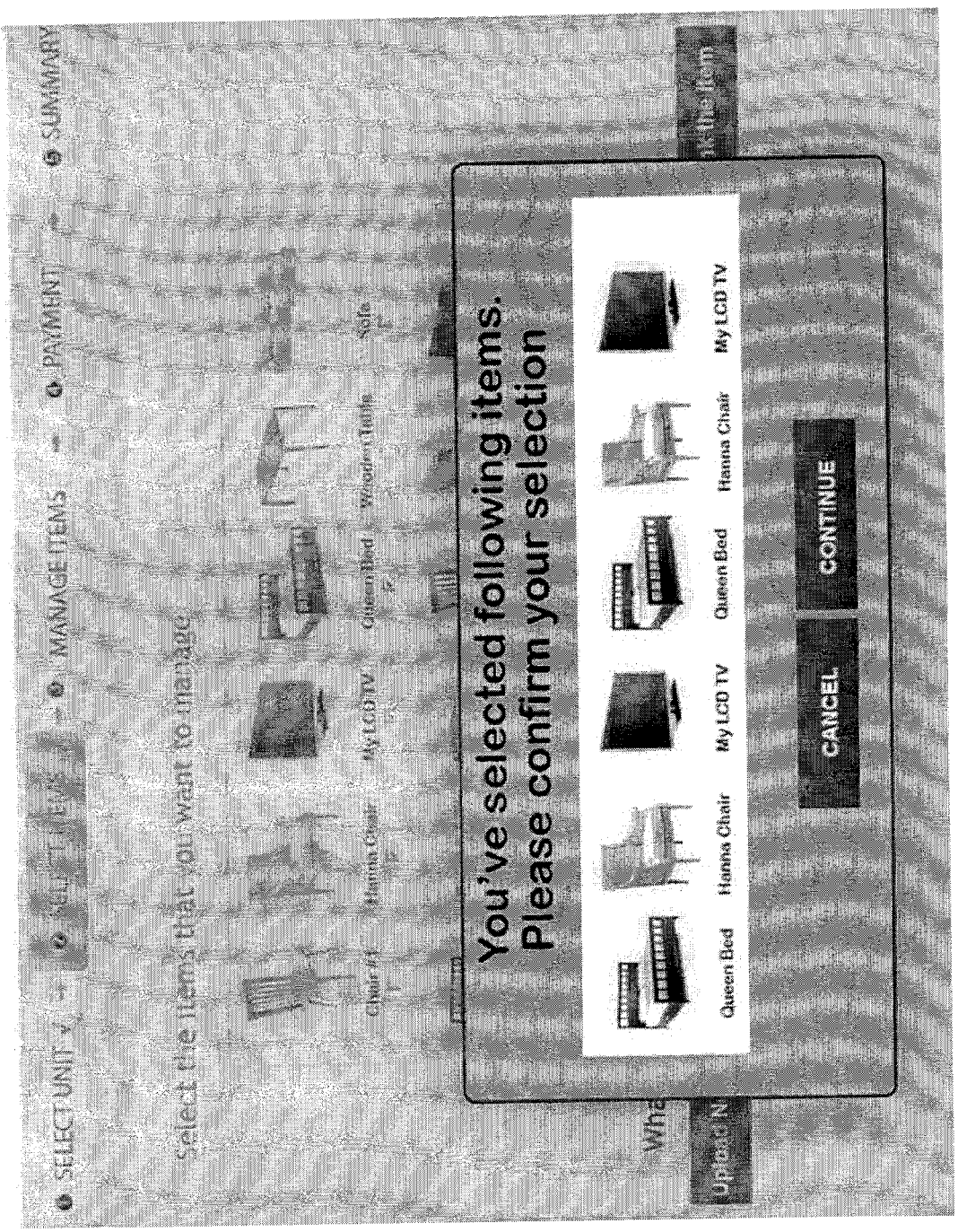

On the management page, the user is able to manage the information associated with the stored items and is able to manage the stored items themselves. For example, the user can choose add additional items to the selected storage unit, edit items displayed (e.g., change pictures), and/or delete items that are displayed (see e.g. box 1205). The user can also select specific actions relating to each of the stored items, such as retrieving an item, selling an item (e.g., on eBay or Yahoo! Auctions), and disposing of an item (see e.g. box 1210). Other management options can also be made available to the user (e.g., adding an inventory list when a box of items is stored). The server 10 can also be configured to present a confirmation page to the user confirming the items that the user wishes to manage (e.g., as shown in FIG. 13).

The management page can also be adapted for use with mobile storage containers (e.g., containers that are brought to the user). For example, the user can be given the option to request that the storage company 15 deliver the storage container when the user is ready, pick up an already-delivered storage container, re-deliver a storage container that already has items stored in it. The user can also be given the option to specify the address of where they want the storage container delivered. The user can also provide special instructions to the storage company regarding where on the user's property the container should be left (e.g., in back of a house, on a certain spot in a user's driveway, etc).

If the user chooses to add additional items, then at stage 1015, preferably the server 10 presents a series of screens similar to those described with respect to stages 115, 120, and 145 of the process 100. If by adding additional items to the storage space, the user has outgrown the previously rented storage space, the user can be prompted to upgrade to a larger storage space, or to rent another unit.

If the user chooses to edit the selected items, then at stage 1020, preferably the server 10 presents a series of screens similar to those described with respect to stage 145 of the process 100.

Figure 14:
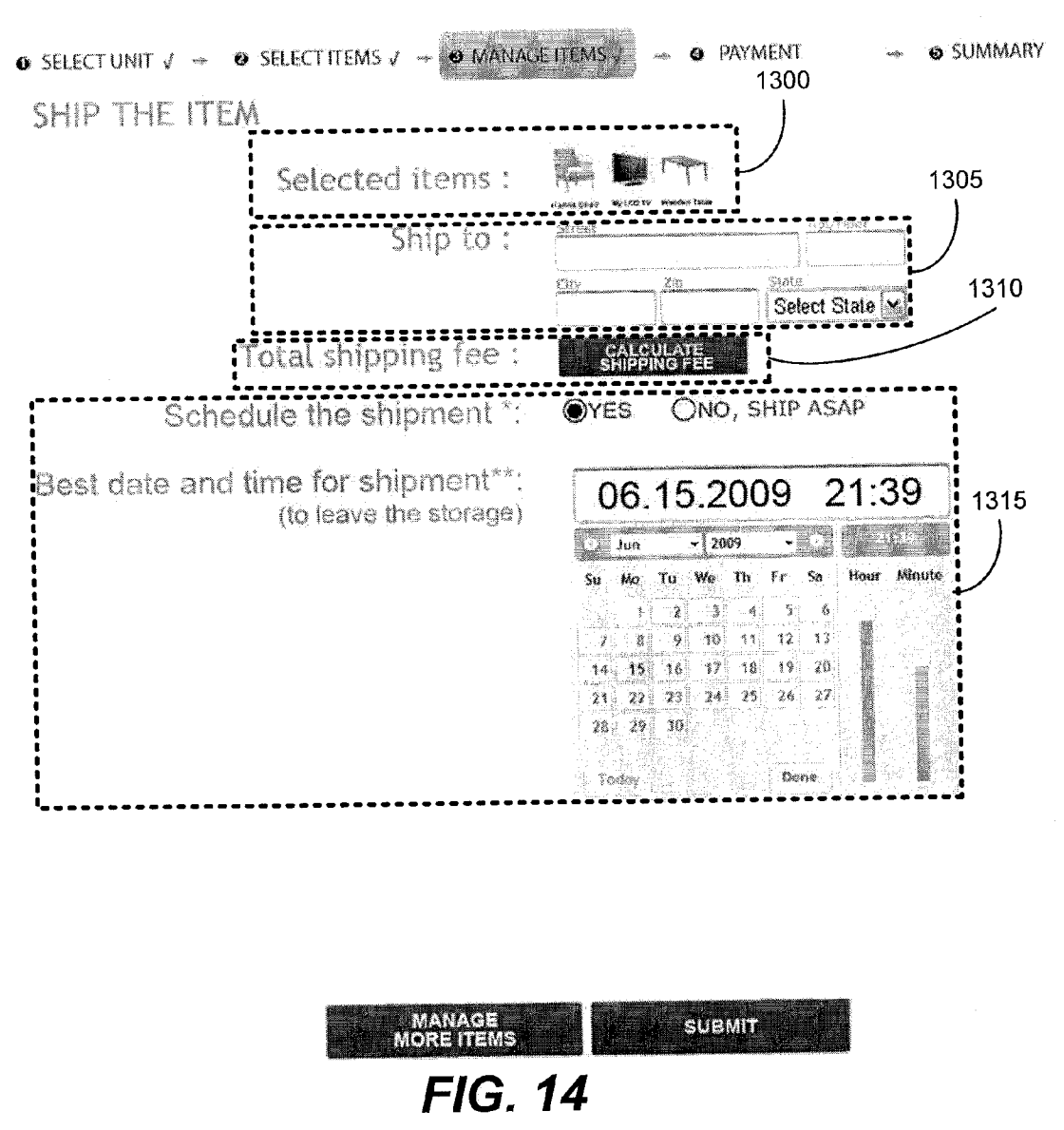

If the user chooses to retrieve selected items, then at stage 1025, preferably the server 10 presents a "retrieval page" to the user (e.g., as shown in FIG. 14). On the retrieval page, the server 10 preferably shows to the user the items that the user has selected to manage (see e.g. box 1300). On the retrieval page, the user also has the ability to provide an address to ship the selected items to (see e.g. box 1305), a total shipping fee (see e.g. box 1310), and set up a desired delivery time (see e.g. box 1315). The user can also be provided with the option to have the selected item shipped immediately. In all cases, the user can be required to pay a fee.

Figure 15:

If the user chooses to sell the selected items, then at stage 1030, preferably the server 10 presents a "selling page" to the user (e.g., as shown in FIG. 15). On the selling page, the server 10 can show the user the selected items that the user has selected to sell (see e.g. box 1400). On the selling page, the user also has the ability to provide information that can be used to create an online listing, such as an eBay listing (see e.g. box 1405). For example, the user can provide the minimum acceptable price, a buy it now option, a buy it now price, a listing title, a listing description, and extra information. Preferably, the user is also presented with a transaction fee that will be imposed upon the user. The server 10 can be configured to collect and process the transaction fee regardless of whether the item every actually sold in the auction. Upon completion of the selling page, the server 10 is configured to send the information to eBay such that a listing is generated on eBay, and to send instructions to the storage company 15 to transfer the selected items to a third party (e.g., once a sale has been completed, or to a consignment broker).

While stage 1025 has been described with respect to eBay, other options are possible. For example, the user can decide to sell/give away the selected items on any one of a number of online sites (e.g., eBay, Amazon.com, Yahoo! Auctions, Craigslist, etc.), or can arrange to sell items through local brick and mortar stores (e.g., consignment stores).

Figure 16:
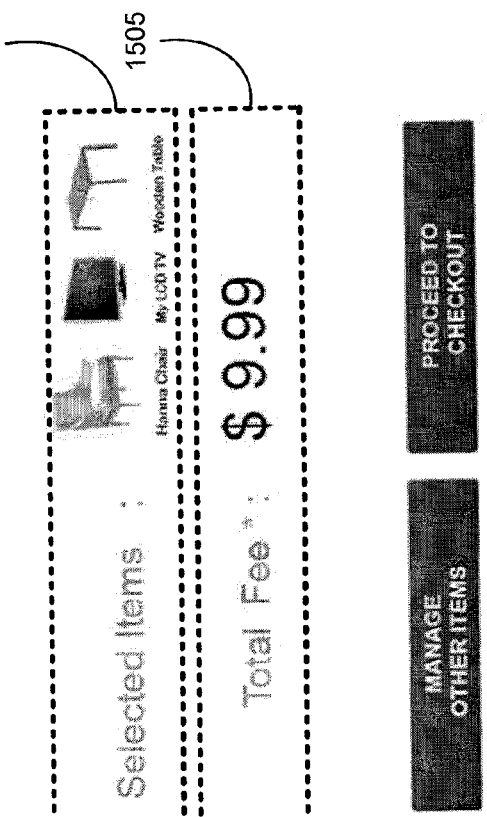

If the user chooses to dispose of the selected items, then at stage 1035, preferably the server 10 presents a "disposal page" to the user (e.g., as shown in FIG. 16). On the disposal page, the server 10 preferably shows to the user the selected items that the user has selected to dispose of (see e.g. box 1500). On the disposal page, the user can also be informed of the cost to dispose of the selected items (see e.g. box 1505). The user can also be presented with an option to donate the selected items to charity.

At stage 1030, the user can be presented with an option to manage additional items. The option to manage additional items can be presented as a separate screen, or as part of any of stages 1015, 1020, 1025, 1030, and 1035. If the user would like to manage additional items, the process 1000 preferably proceeds to stage 1010. Otherwise, the process 1000 continues to stage 1035.

Figure 17:
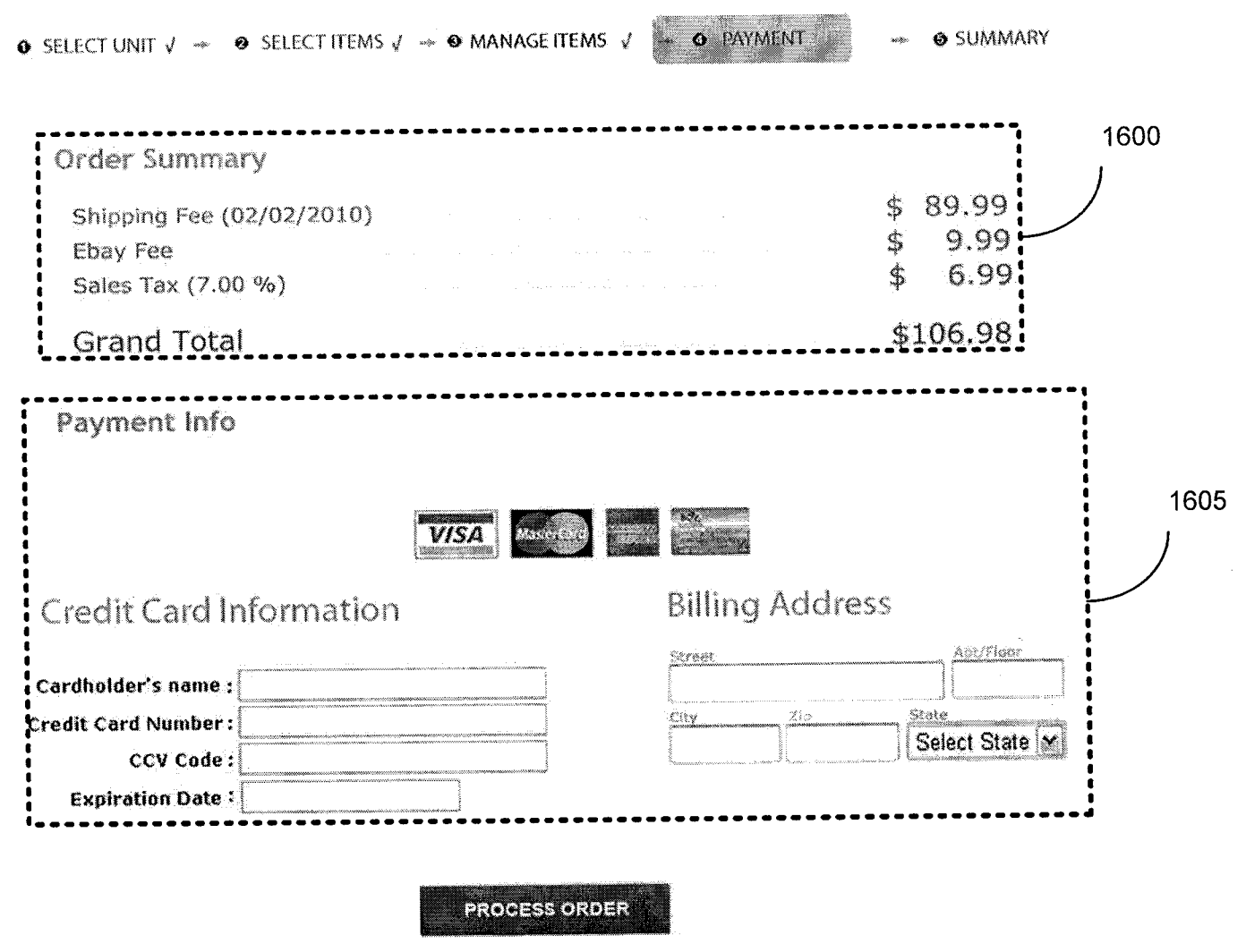

At stage 1035, preferably the server 10 presents a "check out page" to the user (e.g., as shown in FIG. 17). On the checkout page, the server 10 preferably provides the user with a total for all of the requested services (see e.g. box 1600), and provides a place for the user to input payment information (see e.g. box 1605). Alternatively, the server 10 can also be configured to retrieve previously saved payment information from a memory instead of requiring the user to input new payment information. Preferably, upon completion of the process 1000, the server 10 is configured to send instructions to the storage company 15, and/or to any third parties to carry out the choices made by the user during the process 1000.

Figure 18:
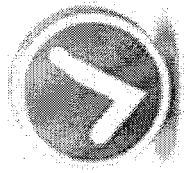

At stage 1040, preferably the server 10 presents a "confirmation page" to the user (e.g., as shown in FIG. 18).

RFIDs

In certain embodiments, the processes described herein can be configured to work with active and/or passive RFID tags. Preferably, as items are picked up, or dropped off, the storage company 15 can arrange for an RFID tag to be attached to each stored item. Using this technique, the storage company 15 can provide real time information regarding the location and/or status of stored items to the user. RFID tags can also provide for greater security and/or easier identification of stored items, thus reducing the likelihood that stored items will be misplaced, lost, or stolen. The user can be presented with the option to have the storage company attach an RFID to stored items during the process of reserving storage space (e.g., at stage 130 of the process 100).

RFIDs can also be used to track the location of an item (e.g., through the use of a wireless network connection). For example, RFID readers can be placed at predetermined locations configured to capture RFID information as the item progresses through the storage system. RFID readers can be placed in places such as in the delivery truck, at the gate of the storage facility, at the door into the storage facility, in individual storage units, etc. Using the information obtained from the RFID tags, real-time location information can be provided to the user (e.g., which bin the user's item is stored in). In this manner a user can, for example, log onto the system 5 and see which bin their case of fine wine is currently stored in.

Management By Storage Company

The storage company 15 can preferably receive and manage the reservations provided by the server 10. Information can be presented to the storage company 15 in a number of manners, and different types of reports can be generated. For example, referring to FIGS. 19-21, information regarding reservations can be presented in a number of different manners. Referring to FIG. 19, the storage company 15 can view a number of different information fields relating to unpaid orders that are currently pending in the system. As another example, referring to FIG. 20, the storage company 15 can also view a customer list, where each customer's entry includes an order ID, a name, an e-mail, a phone number, last login time, Log #, and creation date.

Figure 21:
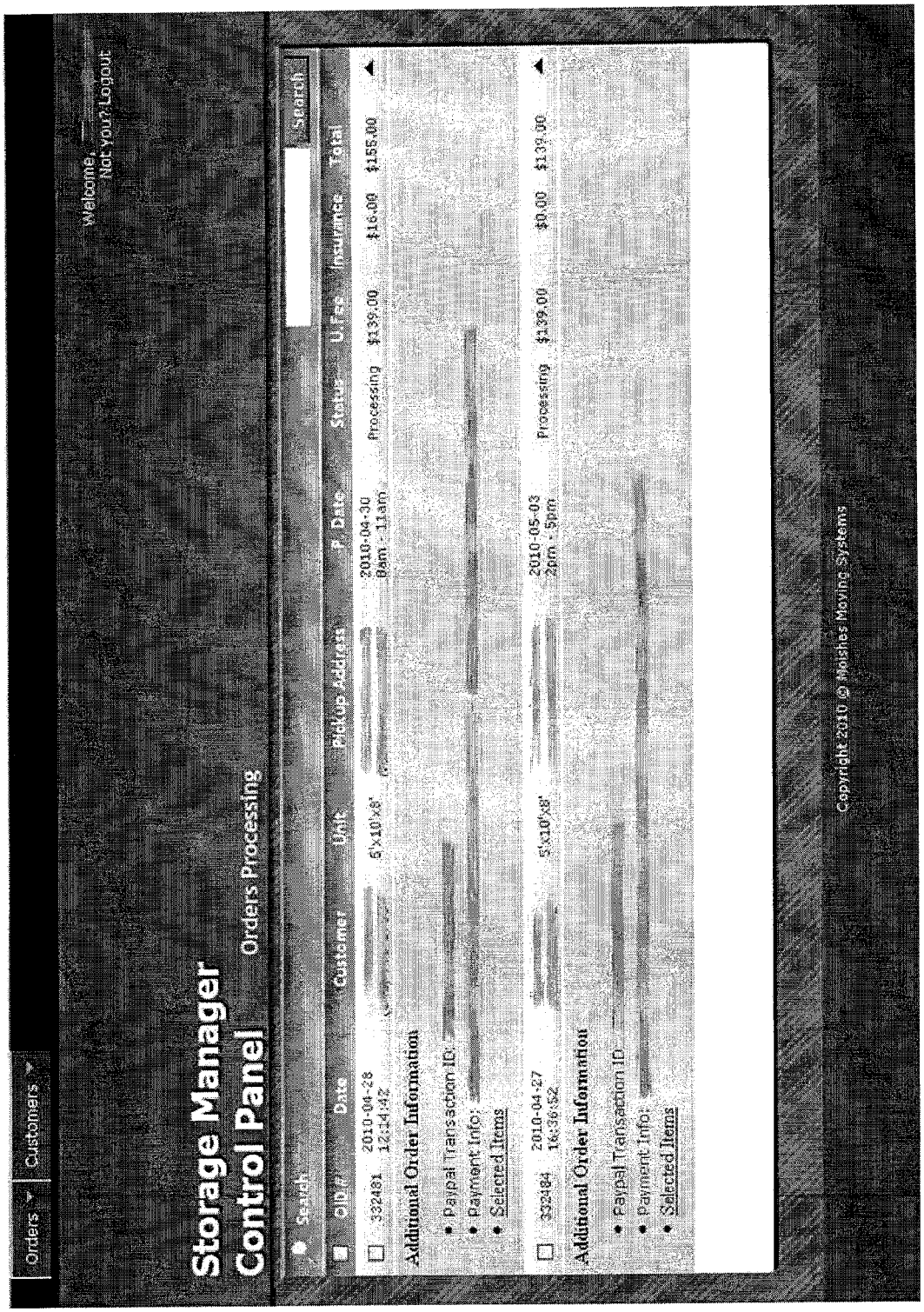

The storage company 15 can also view additional information about individual orders, such as shown in FIG. 21. For each order, the storage company 15 can be shown information such as an order ID, a date of creation, a customer name, a unit size, a pickup address, current status, pickup fee, insurance, total cost, method of payment, payment information, and the items selected for storage.

Other types of information about the unpaid orders, pending orders, and individual orders can also be displayed.

Geolocation

The system 5 can be configured to work with geolocation devices. For example, the system 5 can provide an option to attach a GPS tracking device to items that are stored (e.g., valuable art). Using the GPS tracking device and a wireless connection to the system 5, the precise location of the item can be known at all times. Preferably, the user is able to log onto the system 5 to see in real time the location of the item. For example, as an item is being taken from the user's location to the storage unit, the GPS tracking device can communicate with the system 5 via a wireless connection (e.g., cellular, IEEE 802.11, IEEE 802.15, etc.) to communicate location information. The system 5 can also be configured to provide alerts to the user if, for example, the item is in motion when it is not supposed be, or when the item leaves a predefined area.

Types of Stored Items

The processes described throughout this disclosure can be used for the storage of many different types and classes of items. For example, ordinary household items, alcohol, fine art, and documents can all be catalogued, stored, and/or managed using the processes described herein. By identifying the stored items using reference information such as wine type, artist, and/or client-matter number, users can have greater control over stored items, potentially increasing the ease by which these stored items can be managed. In some embodiments, such as document storage system, the network server 10 can be connected with third-party software (e.g., a docketing system) to manage stored items.

Hosting Options

The system 5 can be adapted to host services for a single company and/or many different companies simultaneously. For example, the system 5 can be configured such that Companies A, B, and C can each allow users to reserve storage space. In this embodiment, preferably the corporate identity (e.g., trademarks, color, and logos) of each of the companies is displayed when the user access the user interface. For example, a user can go to the webpage of Company A, and be presented with an icon to reserve storage space. Once the user clicks on this icon, the request can be forwarded to the server 10, which can recognize that the request came from Company A (versus another company). The server 10 can then present a series of webpages that reflect the corporate identity of Company A. The same can be done for Companies B and C. This can be implemented such that the user is unaware that someone other than Company A is providing the user interface.

In certain embodiments, the server 10 can be configured as a single- or multi-tenancy system. Regardless of whether it is implemented as a single- or multi-tenancy system, the server 10 should be configured to relate specific requests with a particular corporate identity, and should be configured such that security of information is maintained between various companies. Preferably, in a multi-tenancy option, the server 10 is configured such that no information is shared between the various companies using the server 10.

Other Options

Other embodiments are within the scope and spirit of the invention.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Further, while the description above refers to the invention, the description may include more than one invention.

What is claimed is:

1. A non-transitory computer readable storage device comprising instructions that, when executed by a processor, cause the processor to provide a user interface to a user, the user interface being configured to:
   display a plurality of items representing physical items at least some of which may be stored in a storage unit;
   display a drag region representing the storage unit;
   receive instructions from the user to move one or more selected items from the plurality of items into the drag region;
   calculate an estimated amount of space needed to store the one or more selected items and an estimated cost to store the one or more selected items, wherein the calculation is based on dimensions of the one or more selected items and dimensions of the storage unit;

determine whether the estimated amount of storage space exceeds a predetermined threshold value; and allowing, by the user interface, the user to transmit payment information to the storage unit without buying insurance if the estimated amount of storage space does not exceed the predetermined threshold value, and preventing, by the user interface, the user from transmitting payment information for the storage unit until buying insurance if the estimated amount of storage space exceeds the predetermined threshold value.

2. The non-transitory computer storage device of claim 1, further comprising providing at least one of an option for the user to arrange for pickup of the one or more selected items and an option to allow the user to self-deliver the one or more selected items.

3. The non-transitory computer readable storage device of claim 1, wherein the instructions are further configured such that the user interface is configured to display a list of storage locations for the user to pick from.

4. The non-transitory computer readable storage device of claim 1, wherein the instructions are further configured such that the user interface is configured to provide an option for the user to select a quantity of the one or more selected items.

5. The non-transitory computer readable storage device of claim 1, wherein the instructions are further configured such that the user interface is configured to prompt the user to purchase insurance for the one or more selected items.

6. The non-transitory computer readable storage device of claim 5, wherein the instructions are further configured such that the user interface is configured to prompt the user with multiple levels of insurance.

7. The non-transitory computer readable storage device of claim 1, wherein the instructions are further configured such that the processor prompts the user to call a provider of the storage unit if a volume of the one or more selected items exceeds a threshold.

8. The non-transitory computer readable storage device of claim 1, wherein the instructions are further configured such that the user interface is configured to prevent the user from proceeding until at least one predetermined condition is satisfied.

9. The non-transitory computer readable storage device of claim 8, wherein the at least one predetermined condition is selected from the group consisting of a purchase of insurance, an acceptance of terms and conditions, an authentication of the user, and an approval of payment information.

10. The non-transitory computer readable storage device of claim 8, wherein the at least one predetermined condition is the purchase of insurance, and wherein the user is prompted to choose between at least one of multiple amounts of insurance and different types of insurance.

11. The non-transitory computer readable storage device of claim 1, wherein the instructions are further configured such that the user interface is configured to provide an option to the user to upload images for each of the one or more selected items.

12. The non-transitory computer readable storage device of claim 1, wherein the instructions are further configured to cause the processor to calculate the estimated amount of storage space needed to store the one or more selected items.

13. The non-transitory computer readable storage device of claim 12, wherein the instructions are further configured to cause the processor to calculate the estimate amount of storage space needed to store the one or more items as a function of an estimated volume associated with each selected item, and an adjustment factor.

14. A method for reserving storage space, the method comprising:

storing instructions on a non-transitory computer readable storage device for execution by a processor to provide a user interface to a user;

displaying on the user interface a plurality of items representing physical items, at least some of which may be stored in a storage unit;

displaying a drag region on the user interface representing the storage unit;

selecting one or more items from among the plurality of items and moving the selected one or more items into the drag region;

calculating an estimated amount of space needed to store the one or more selected items and an estimated cost to store the one or more selected items, wherein the calculation is based on dimensions of the one or more selected items and dimensions of the storage unit;

determining, using the computer processor, whether the estimated amount of storage space exceeds a predetermined threshold value; and allowing, by the user interface, the user to transmit payment information to the storage unit without buying insurance if the estimated amount of storage space does not exceed the predetermined threshold value, and preventing, by the user interface, the user from transmitting payment information for the storage unit until buying insurance if the estimated amount of storage space exceeds the predetermined threshold value.

15. The method of claim 14, further comprising providing at least one of an option for the user to arrange for pickup of the one or more selected items and an option to allow the user to self-deliver the one or more selected items.

16. The method of claim 14, further comprising prompting the user to purchase insurance for the one or more selected items.

17. The method of claim 16, further comprising prompting the user with multiple levels of insurance.

18. The method of claim 14, further comprising preventing the user from proceeding until at least one predetermined condition is satisfied.

19. The method of claim 18, wherein the predetermined condition is selected from a group consisting of a purchase of insurance, an acceptance of terms and conditions, an authentication of the user, and an approval of payment information.

20. The method of claim 19, wherein the predetermined condition is the purchase of insurance, and wherein the user is prompted to choose between at least one of multiple amounts of insurance and different types of insurance.

21. The method of claim 14, further comprising providing an option to the user to upload images for each of the one or more selected items.

22. The method of claim 14, further comprising calculating the estimated amount of storage space needed to store the one or more items as a function of an estimated volume associated with each selected item, and an adjustment factor.

* * * * *